United States Patent [19]

Nicely et al.

[11] Patent Number: 4,860,249
[45] Date of Patent: Aug. 22, 1989

[54] MULTIZONE ARRAY PROCESSOR IMPLEMENTING TWO SIDED ZONE BUFFERS WITH EACH SIDE BEING DYNAMICALLY CONFIGURED AS A WORKING OR I/O SIDE

[75] Inventors: Mark C. Nicely, Mountain View; Robert Schreiber, Palo Alto; Terry M. Parks; A. Joel Mannion, both of Sunnyvale; Gary R. Lang, Saratoga; Charles F. Patton, Milpitas, all of Calif.

[73] Assignee: Saxpy Computer Corporation, Sunnyvale, Calif.

[21] Appl. No.: 784,922

[22] Filed: Oct. 4, 1985

[51] Int. Cl.⁴ ............ G06F 15/00; G06F 15/16; G06F 15/31; G06F 13/00
[52] U.S. Cl. .................... 364/900; 364/736; 364/704
[58] Field of Search ... 364/200 MS File, 900 MS File, 364/300, 736, 704

[56] References Cited

U.S. PATENT DOCUMENTS

| 3,787,673 | 1/1974 | Watson et al. | 364/200 |
| 3,875,391 | 4/1975 | Shapiro et al. | 235/156 |
| 4,075,688 | 2/1978 | Lynch, Jr. et al. | 364/200 |
| 4,541,048 | 9/1985 | Propster et al. | 364/200 |
| 4,546,428 | 10/1985 | Morton | 364/200 |
| 4,580,215 | 4/1986 | Morton | 364/200 |
| 4,589,067 | 5/1986 | Porter et al. | 364/200 |

FOREIGN PATENT DOCUMENTS 1201208 10/1984 Canada ............... 364/736

*Primary Examiner*—Raulfe B. Zache
*Assistant Examiner*—Robert B. Harrell
*Attorney, Agent, or Firm*—Townsend & Townsend

[57] ABSTRACT

A reconfigurable processor array (RPA) for performing high speed operations on data arrays and eliminating I/O bottleneck. The array memory has a working side for storing arrays to be processed during a given array operation, and an I/O side for loading an array to be used during a subsequent operation and downloading an array resulting from a preceding operation.

2 Claims, 20 Drawing Sheets

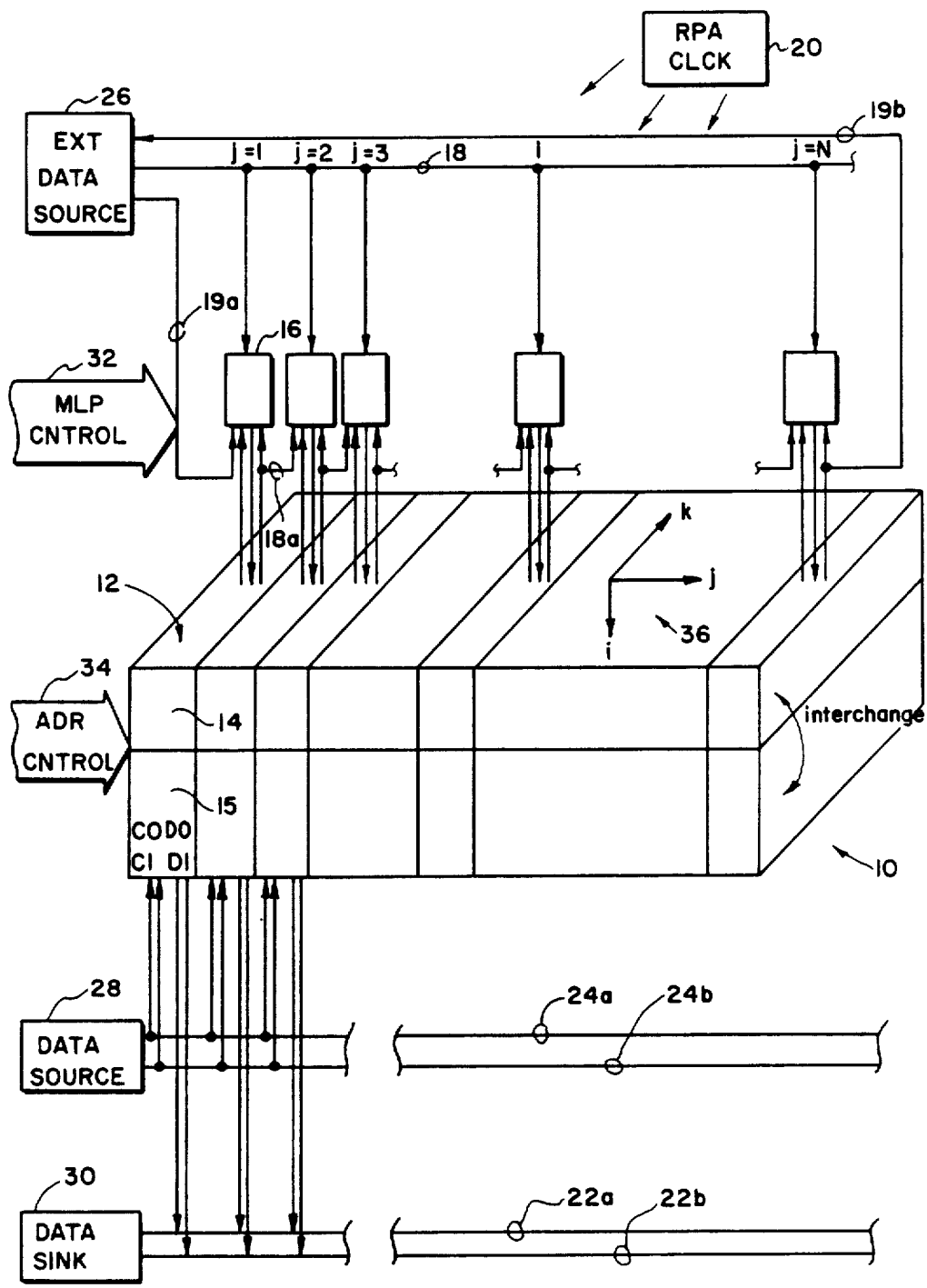
FIG._1.

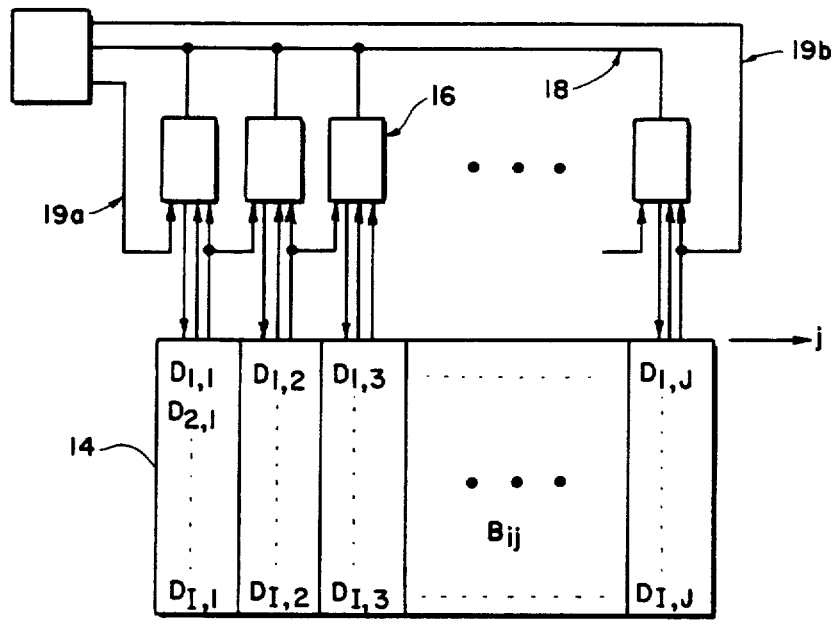
FIG._2.
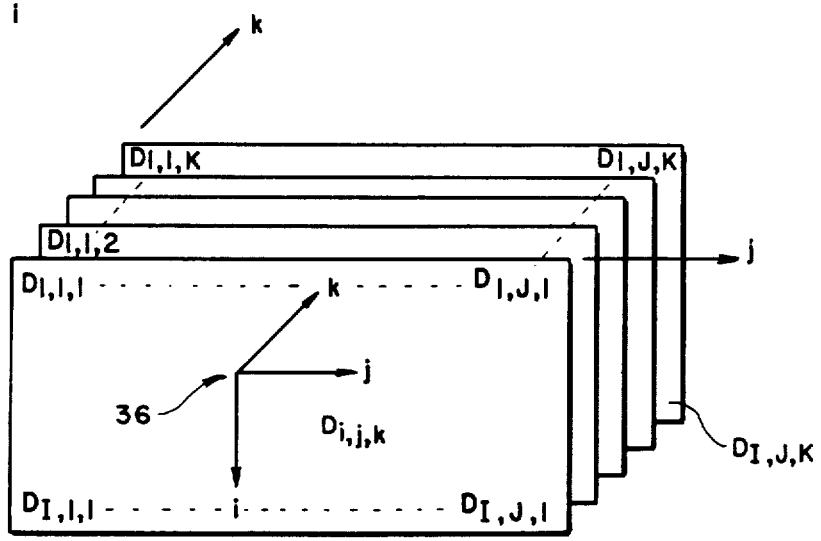
FIG._2A.

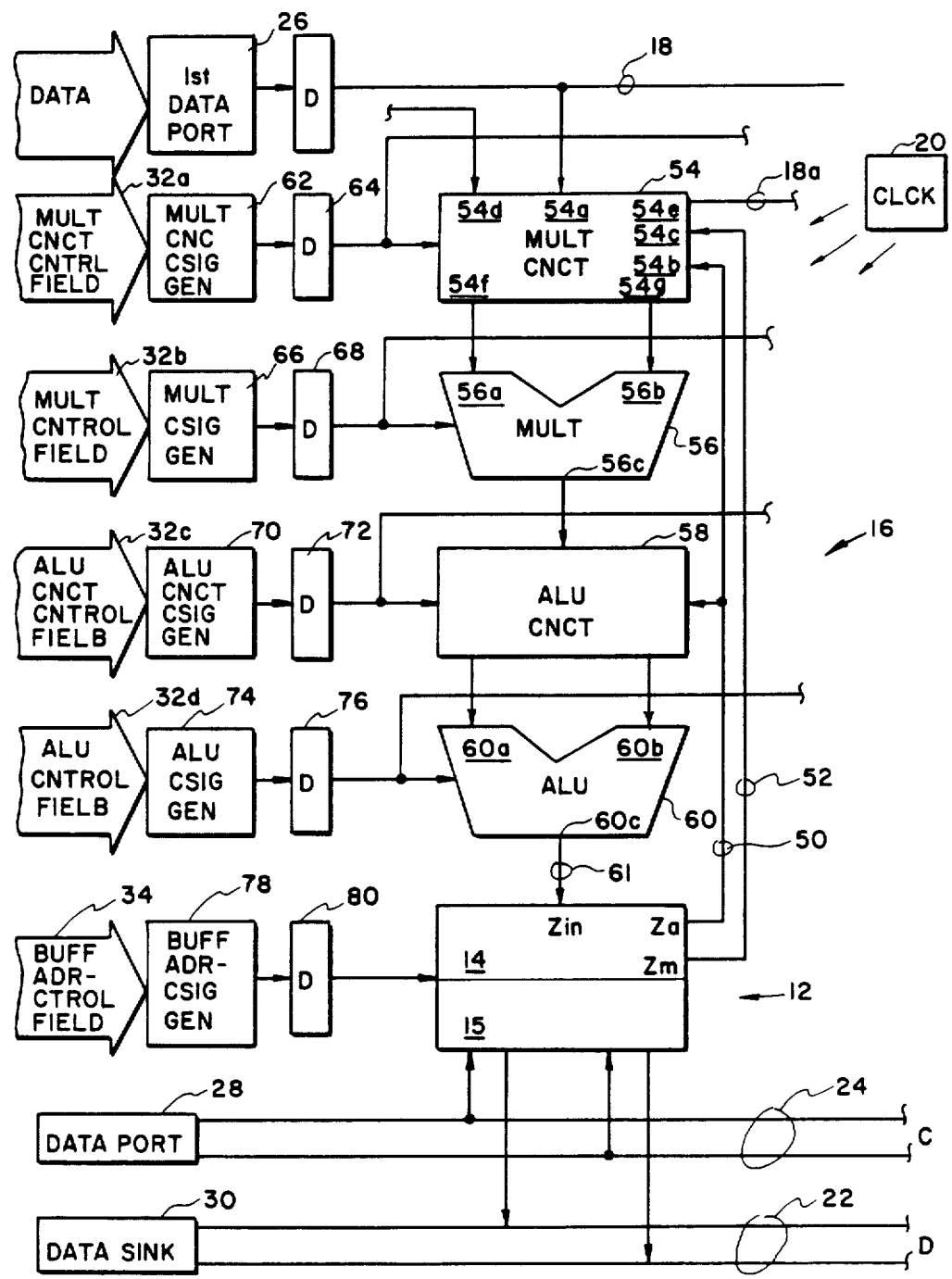
FIG._3.

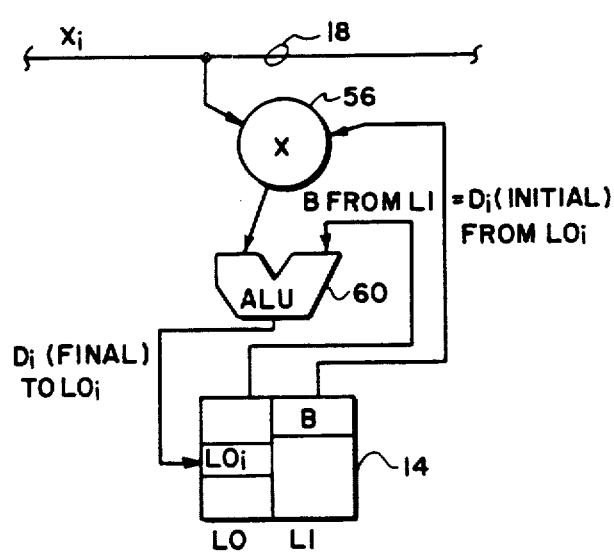
FIG._5.
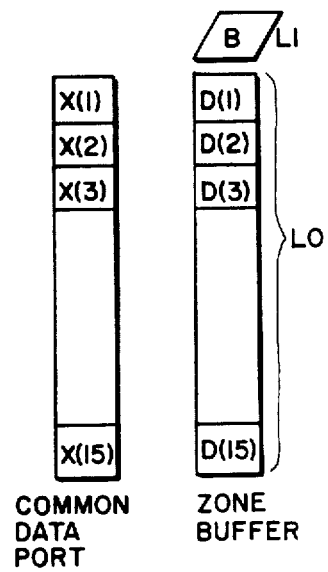
FIG._4.
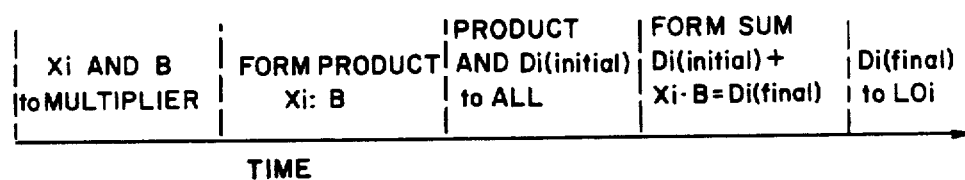
FIG._6.
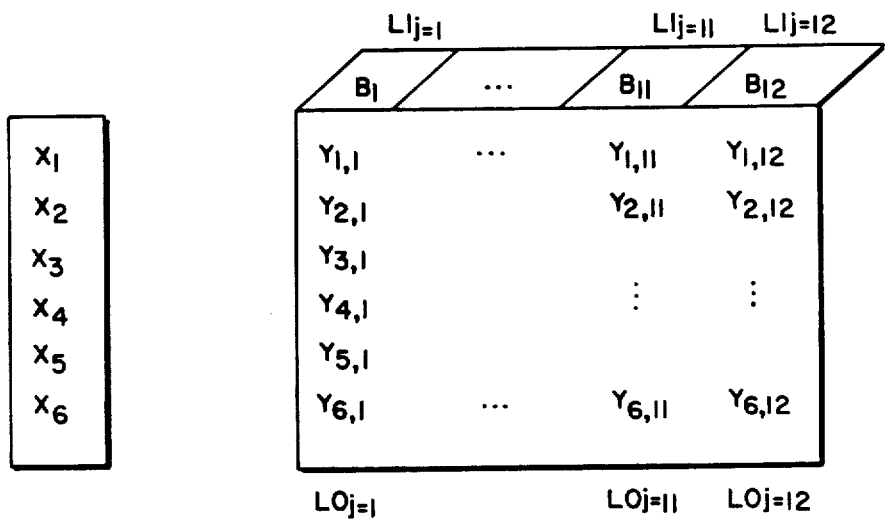
FIG._7.

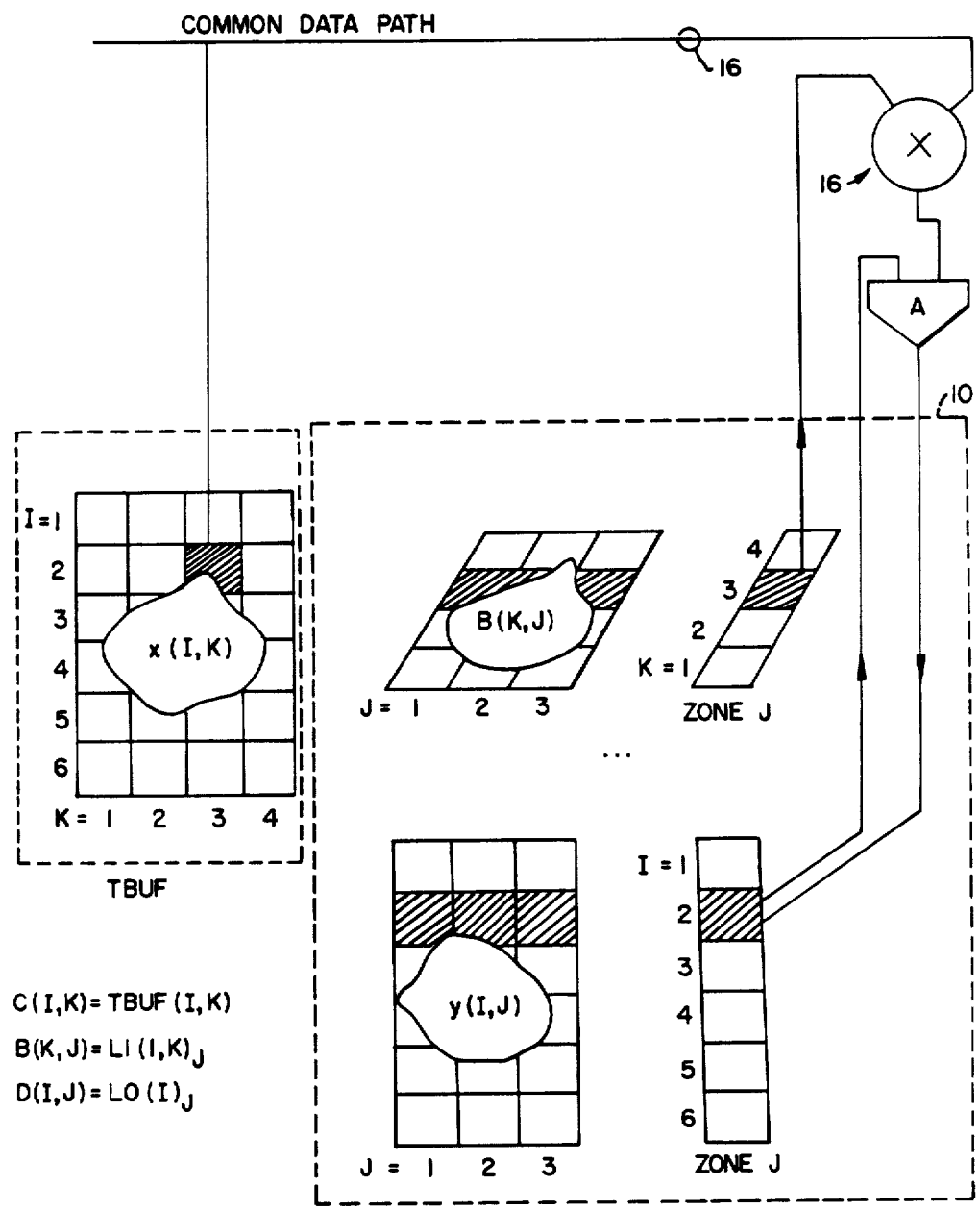
FIG._8.

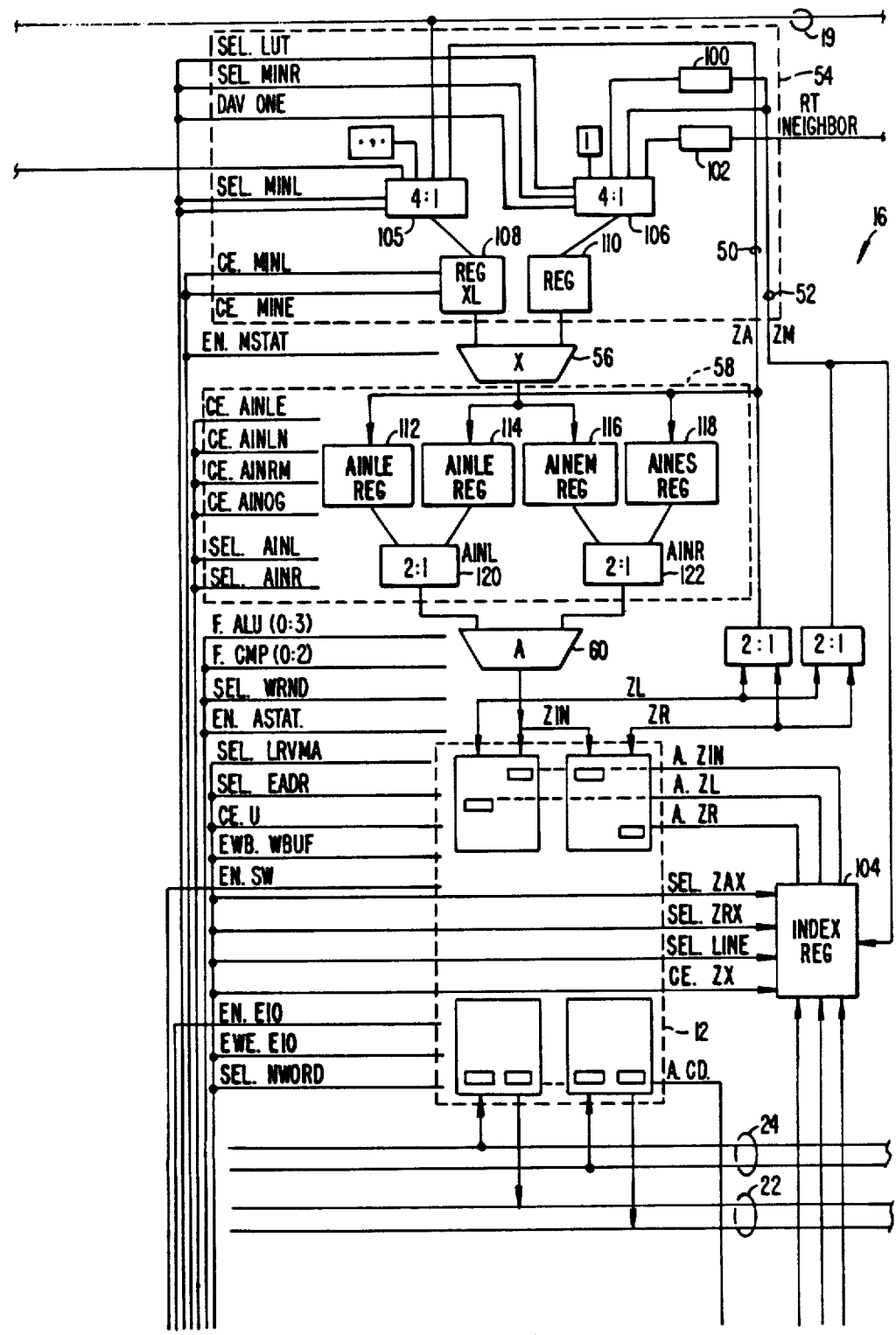
FIG._9A.

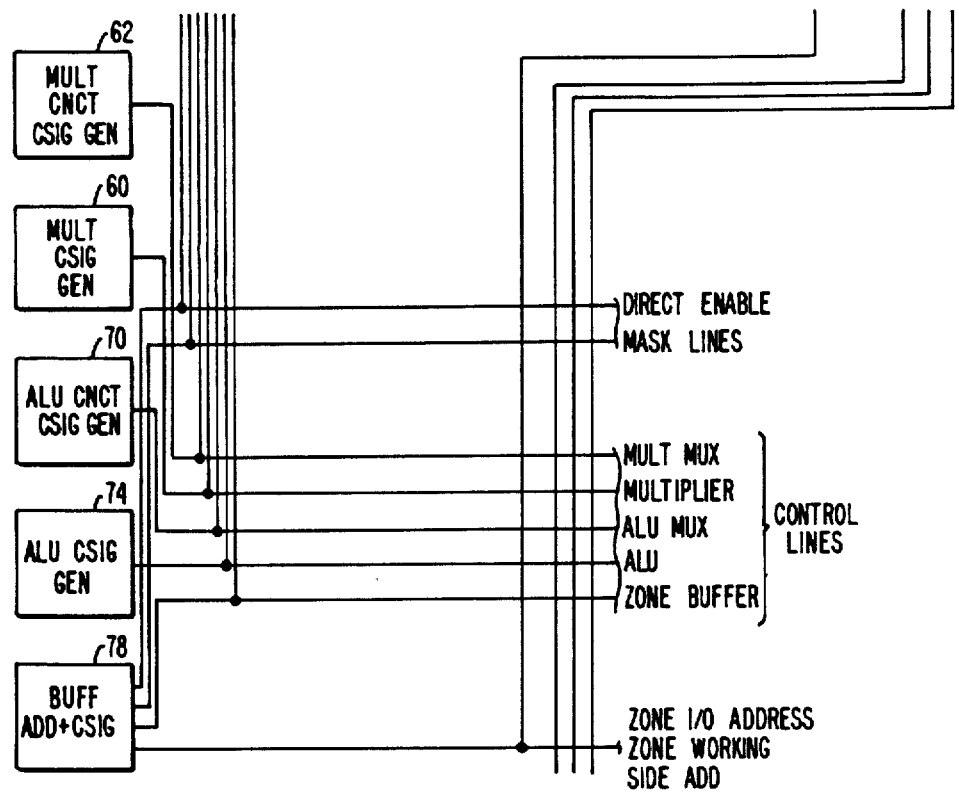
FIG._9B.
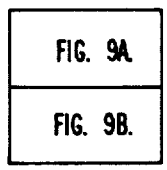
FIG._9.

ARITHMETIC PIPELINE

| | PIPE STAGE #1 | PIPE STAGE #2 | PIPE STAGE #3 | PIPE STAGE #4 | PIPE STAGE #5 | PIPE STAGE #6 | PIPE STAGE #7 |
|---|---|---|---|---|---|---|---|
| PIPELINE FUNCTION | RECIPROCAL SQUARE ROOT LOOKUP | MUX MULT INPUTS | 4 12X12 PARTIAL PRODUCT MULTIPL. | REGISTER PARTIAL PRODUCTS | 1ST STAGE ADD PARTIAL PROD | 2ND STAGE ADD PARTIAL PROD | NORMALIZE & REGISTER FINAL MULT RESULT |
| CONTROL SIGNAL ASSERTED | SEL LUT CS | SEL. MINL. CS<00> SEL. MINL. CS<01> DRV. ONE. CS SEL. MINR. CS CE. MINL. CS CE. MINR. CS | | | | | AINV. INV. CS CE. AINLM. CS CE. AINRM. CS CE. AINLZ. CS CE. AINRZ. CS |

ZONE BUFFER MEMORY

| | PIPE STAGE #1 | PIPE STAGE #2 | PIPE STAGE #3 |
|---|---|---|---|
| PIPELINE FUNCTION | REG ZAAG, ZMAS, ZINAS, COAS, INDEX AND CONTROL | CALCULATE & REG INDEXED ADDRESS REG CO & CI DATA ZIN REG IN MZA-1 PIPE STAGE #14 | WRITE ZIN, CO, &CI REG ZA, ZM, DO, & DI | (ZIN FOR MZA-1 PIPE STAGE #1 & #2 ZA FOR MZA-1 PIPE STAGE #2 & #7; DO & DI; REG AT M/O) |
| CONTROL SIGNAL | SEL. BTYPE CS SEL. ZINX CS SEL. ZAX. CS SEL. ZMX. CS EN. ZAR CS EN. ZMR CS SEL. NWORD. CS EWE. ZIO. CS EWE. WDUFF. CS EN. ZIO. CS | | |

FIG._10A.

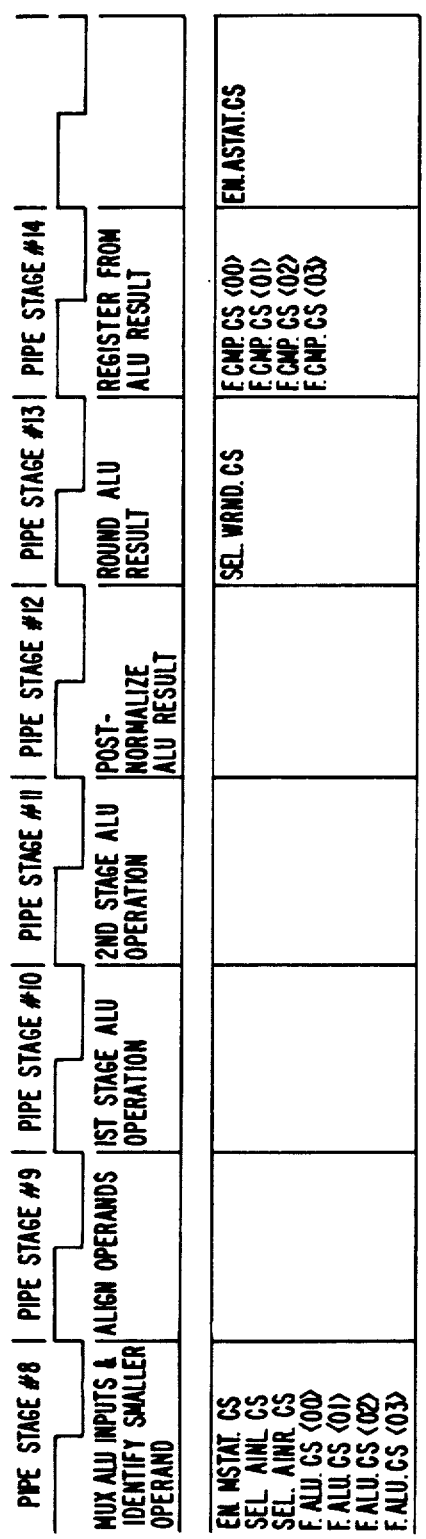
FIG._10B.
FIG._10A. | FIG. 10B.
FIG._10.

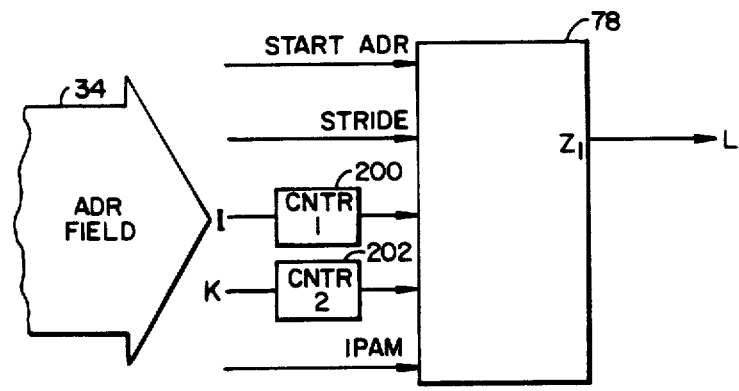
FIG._11.
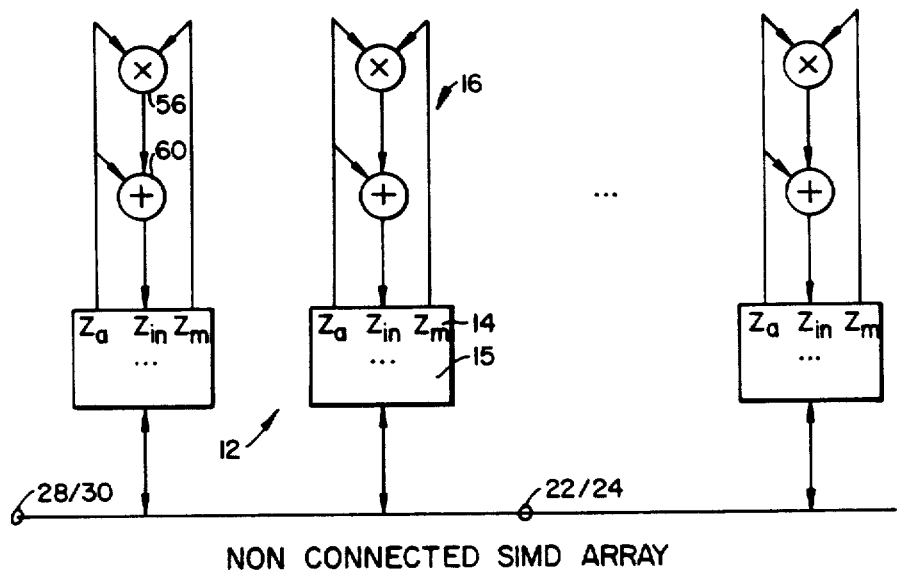
NON CONNECTED SIMD ARRAY
FIG._13A.

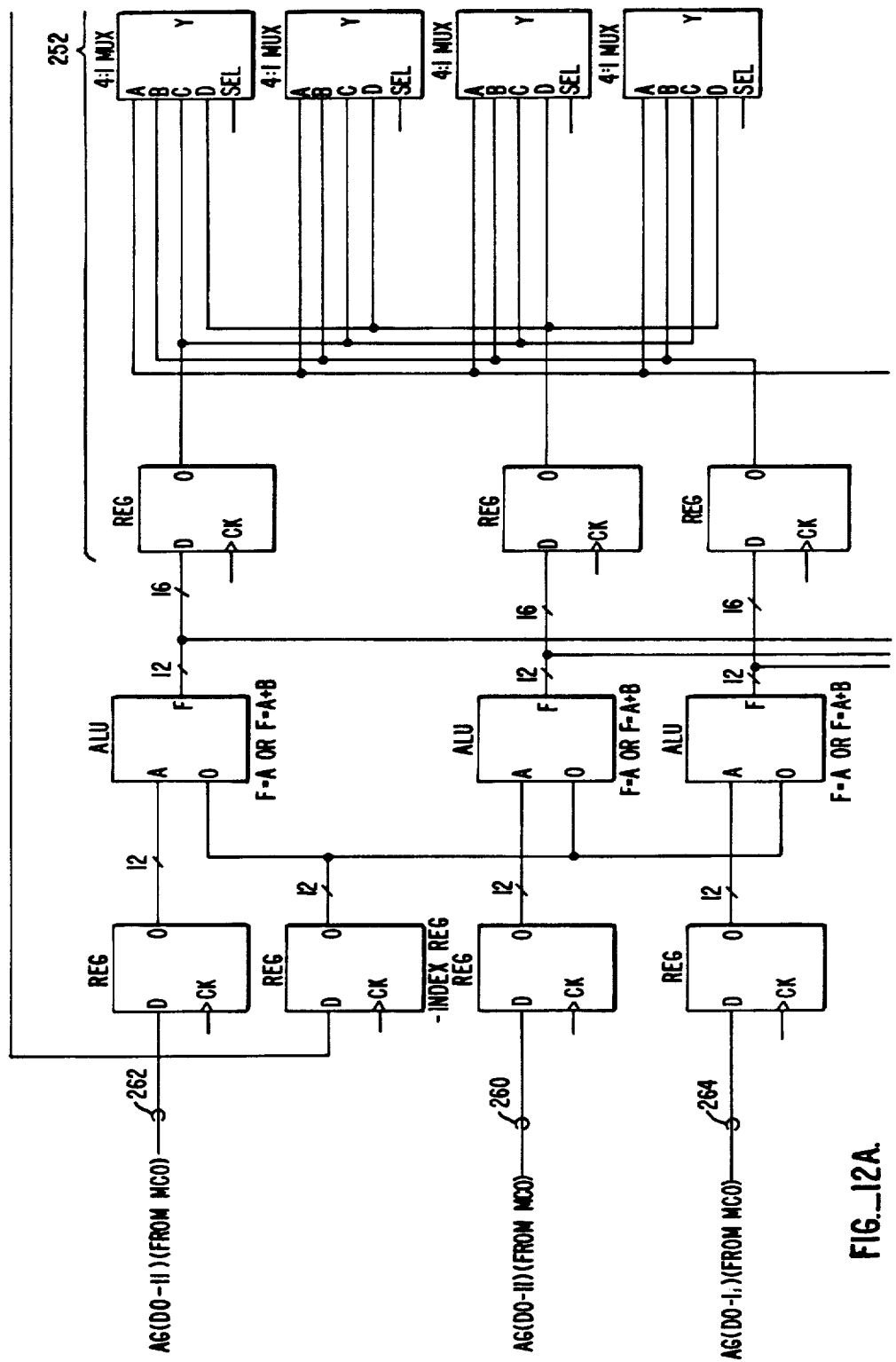
FIG._12A.

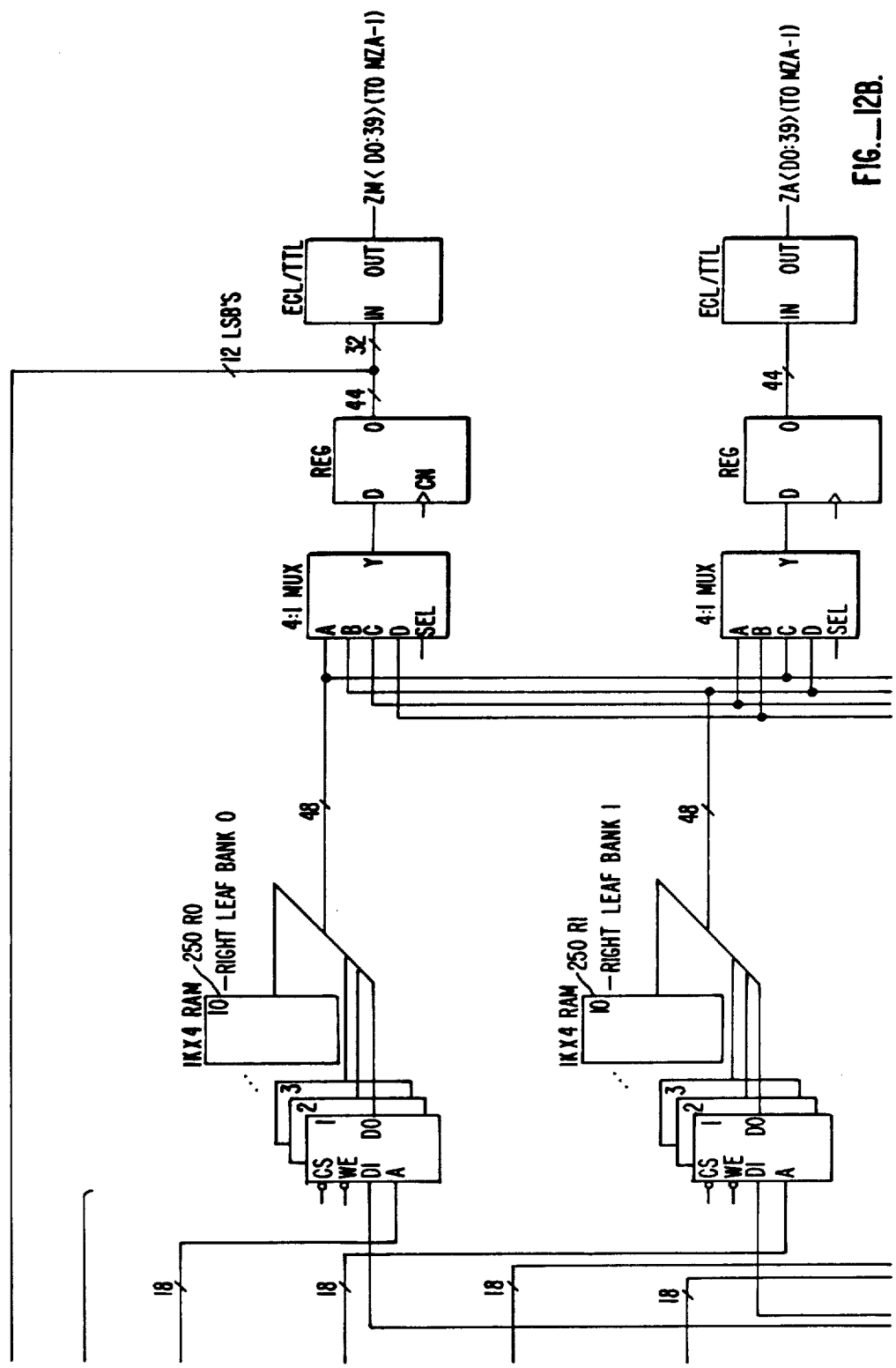
FIG._12B.

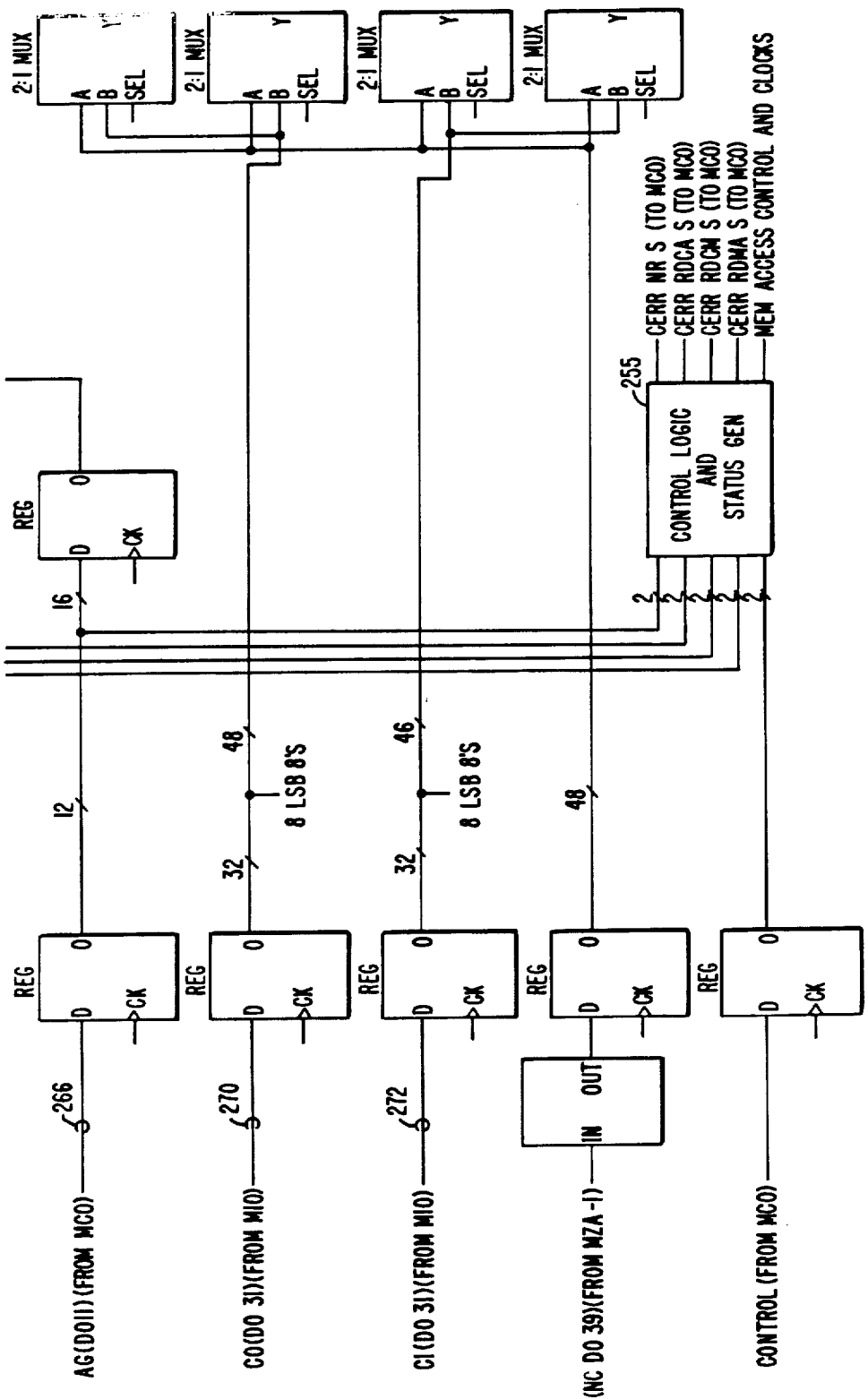
FIG._12C.

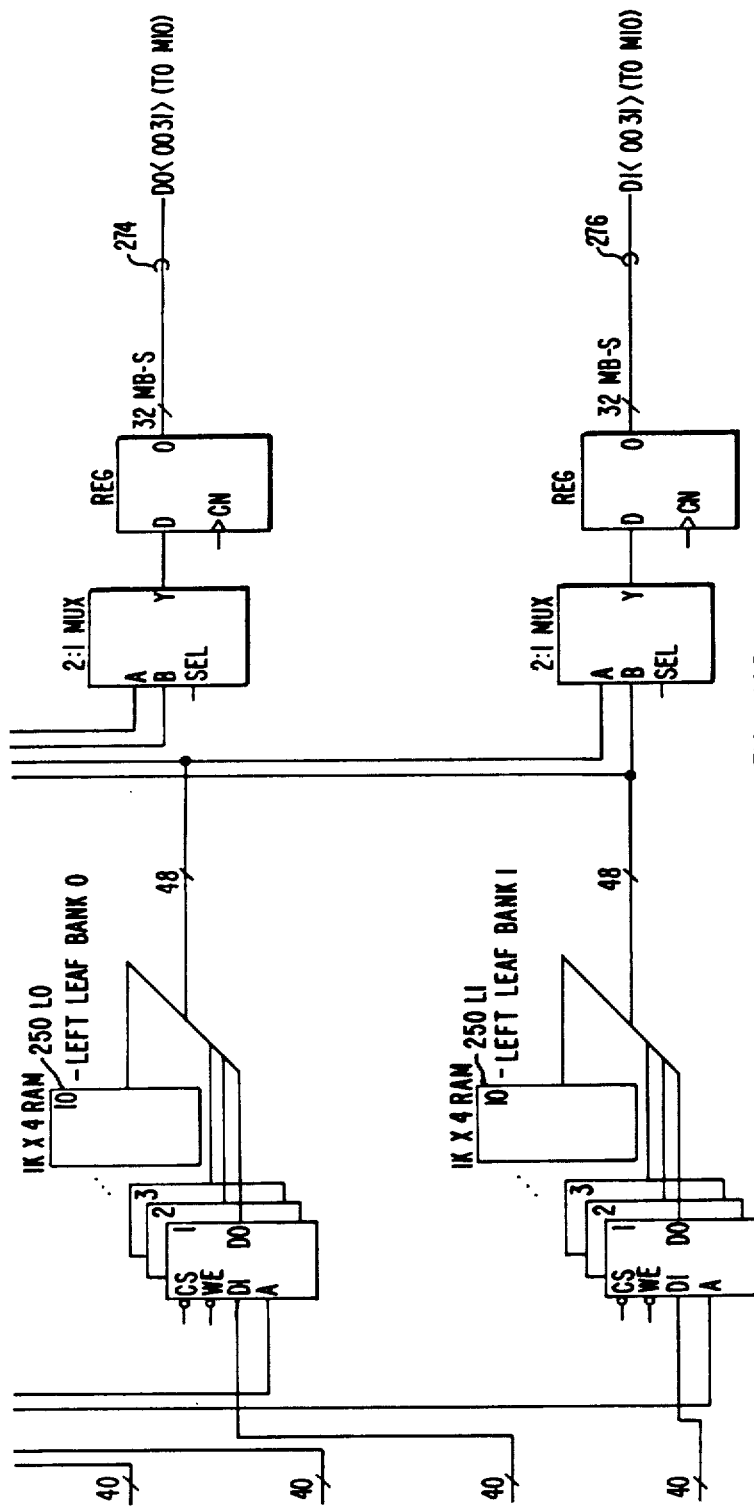

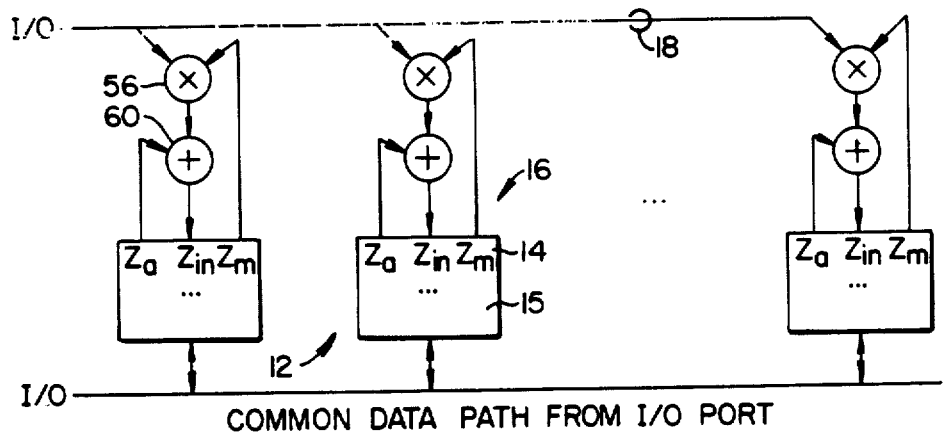
COMMON DATA PATH FROM I/O PORT
*FIG._13B.*
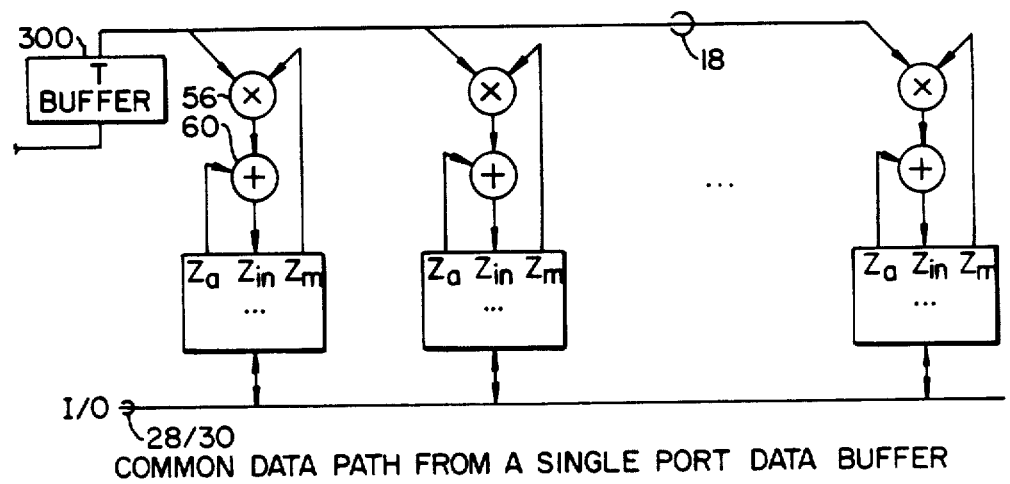
COMMON DATA PATH FROM A SINGLE PORT DATA BUFFER
*FIG._13C.*
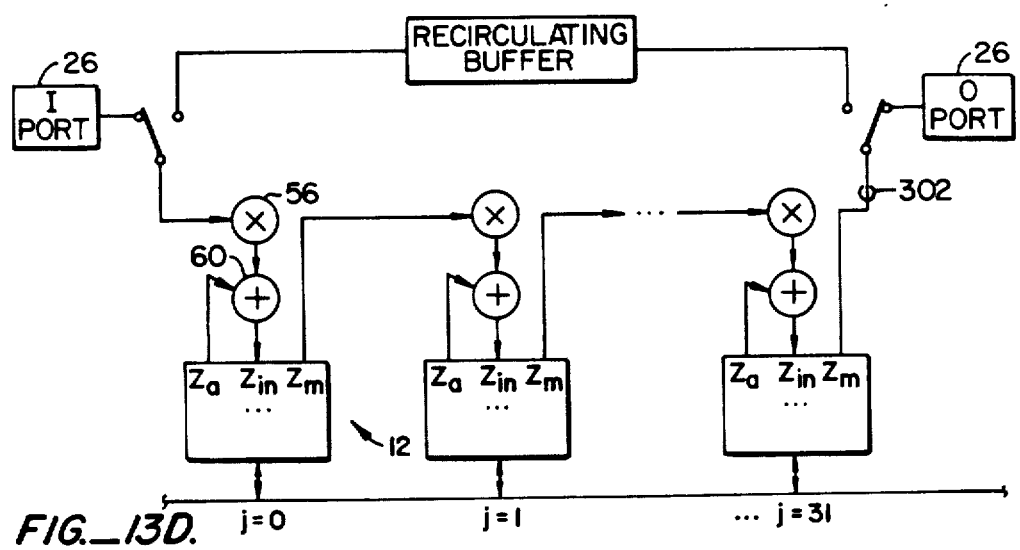
*FIG._13D.*  $j=0$   $j=1$   $... j=31$

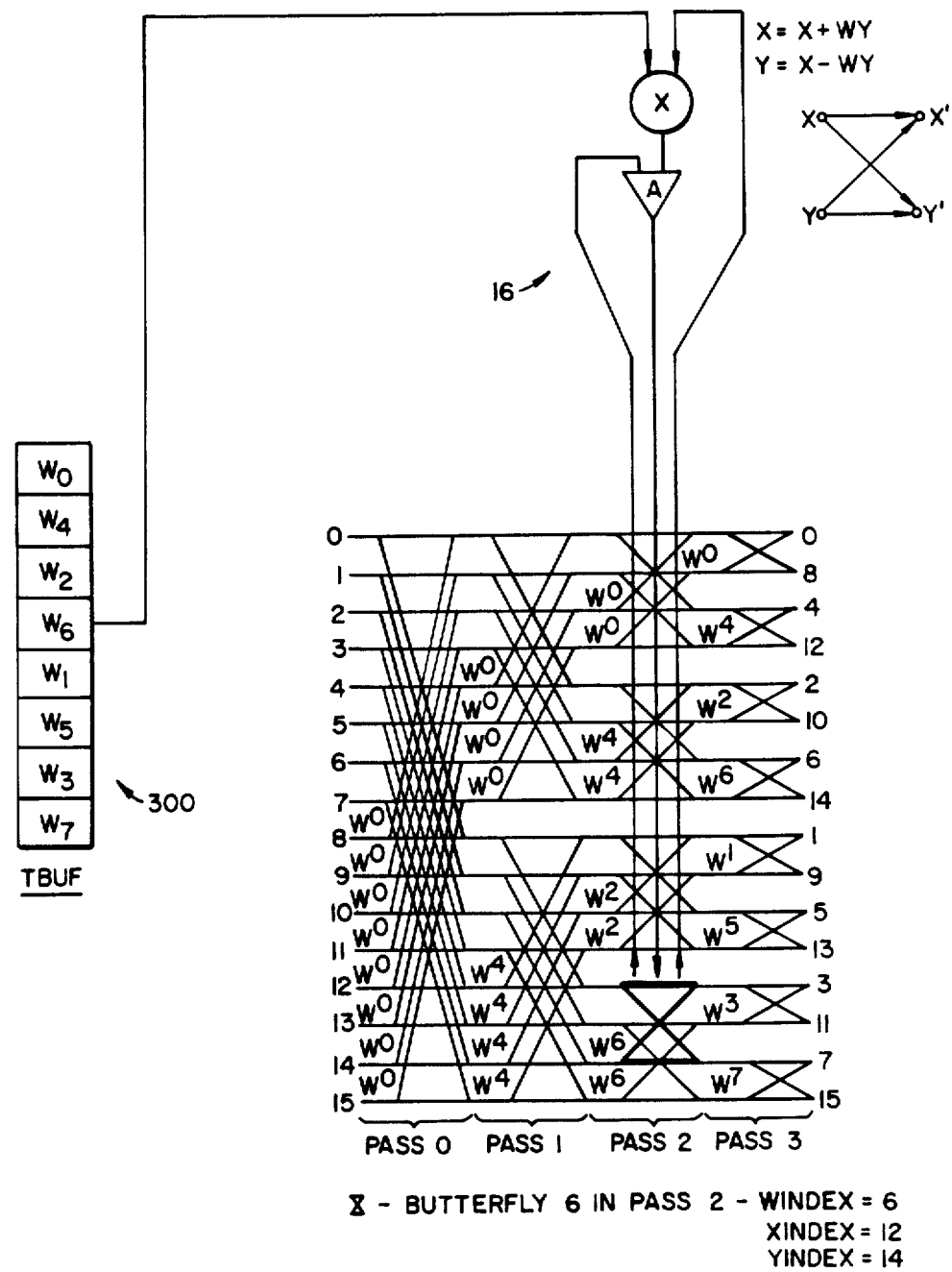
FIG._14.

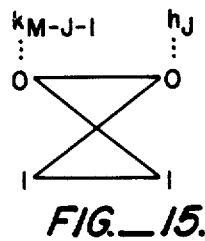
FIG._15.
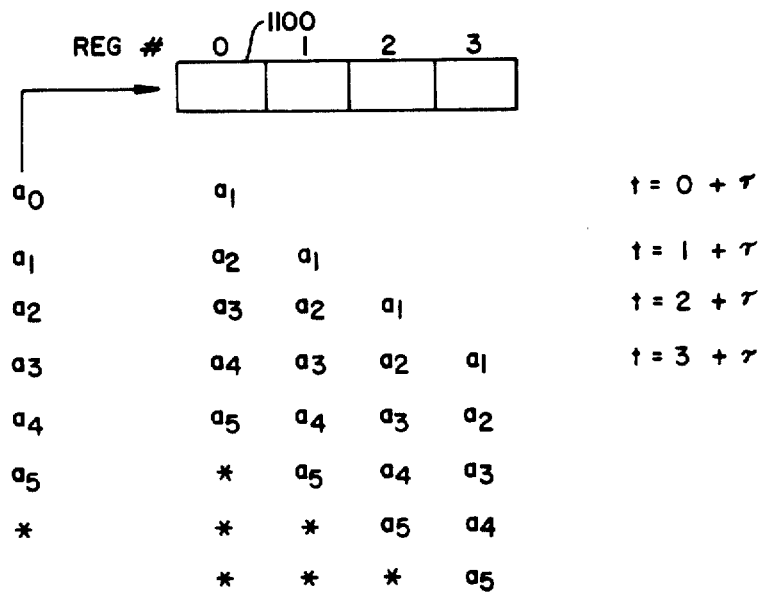
FIG._16.

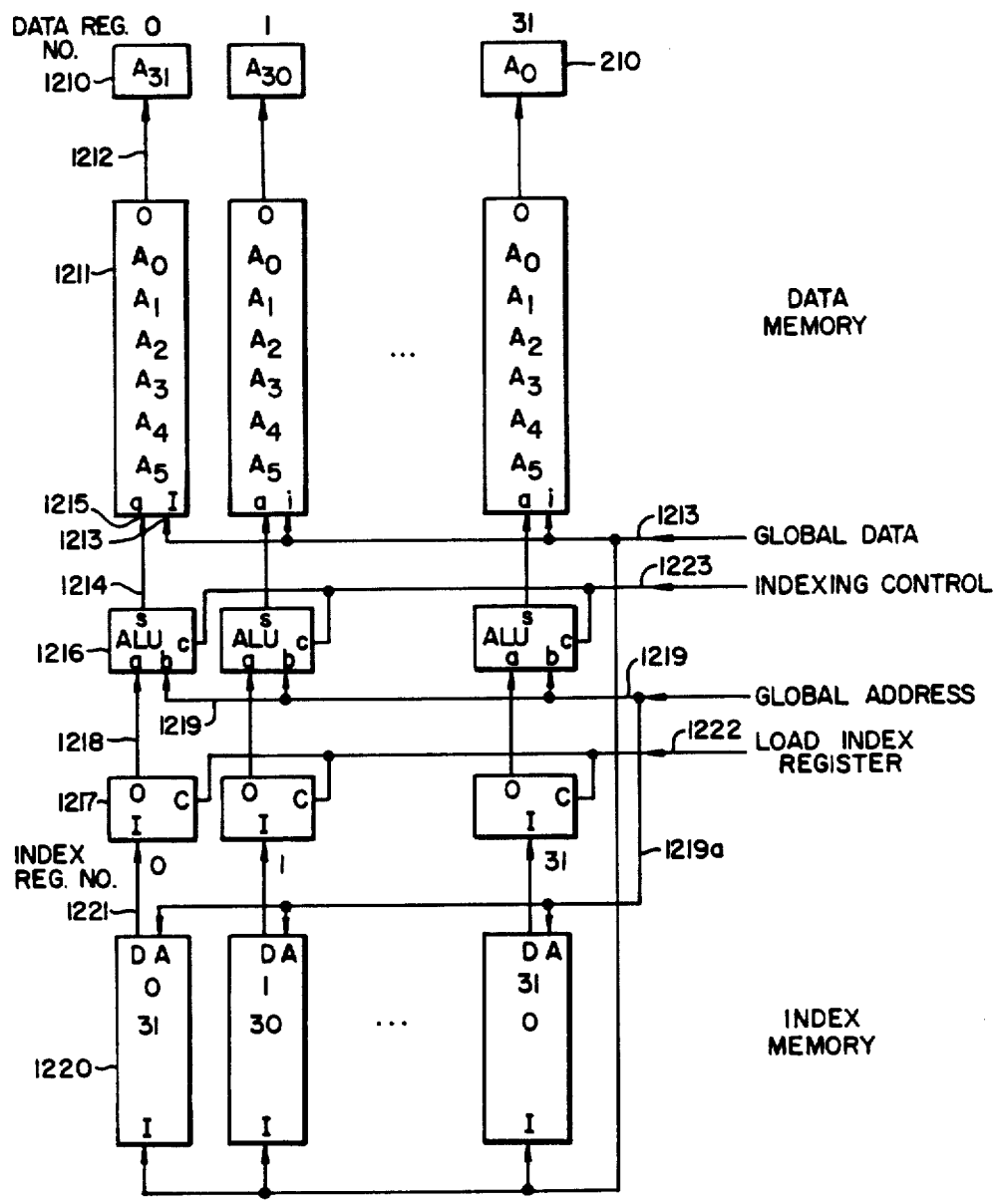
FIG._17.

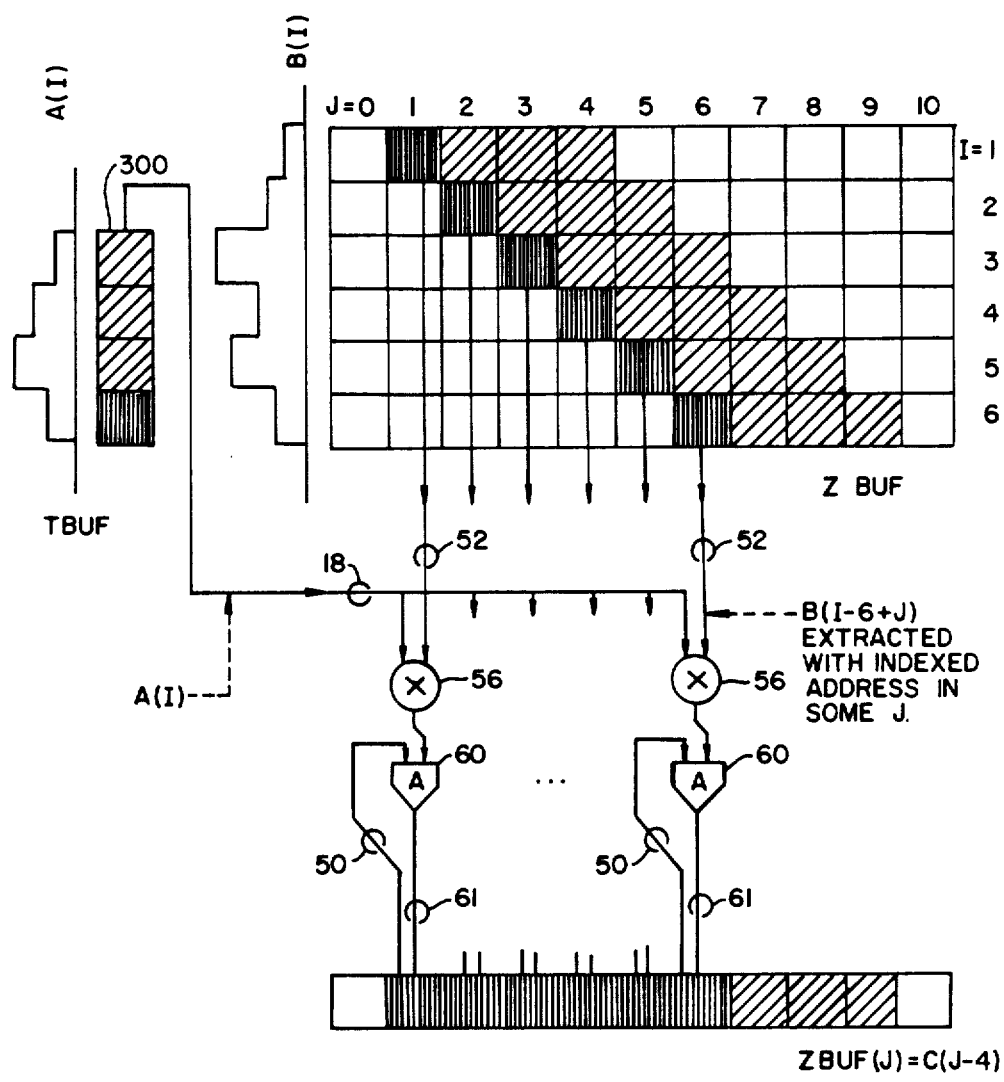
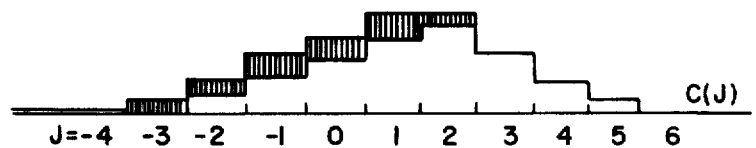
FIG._18.

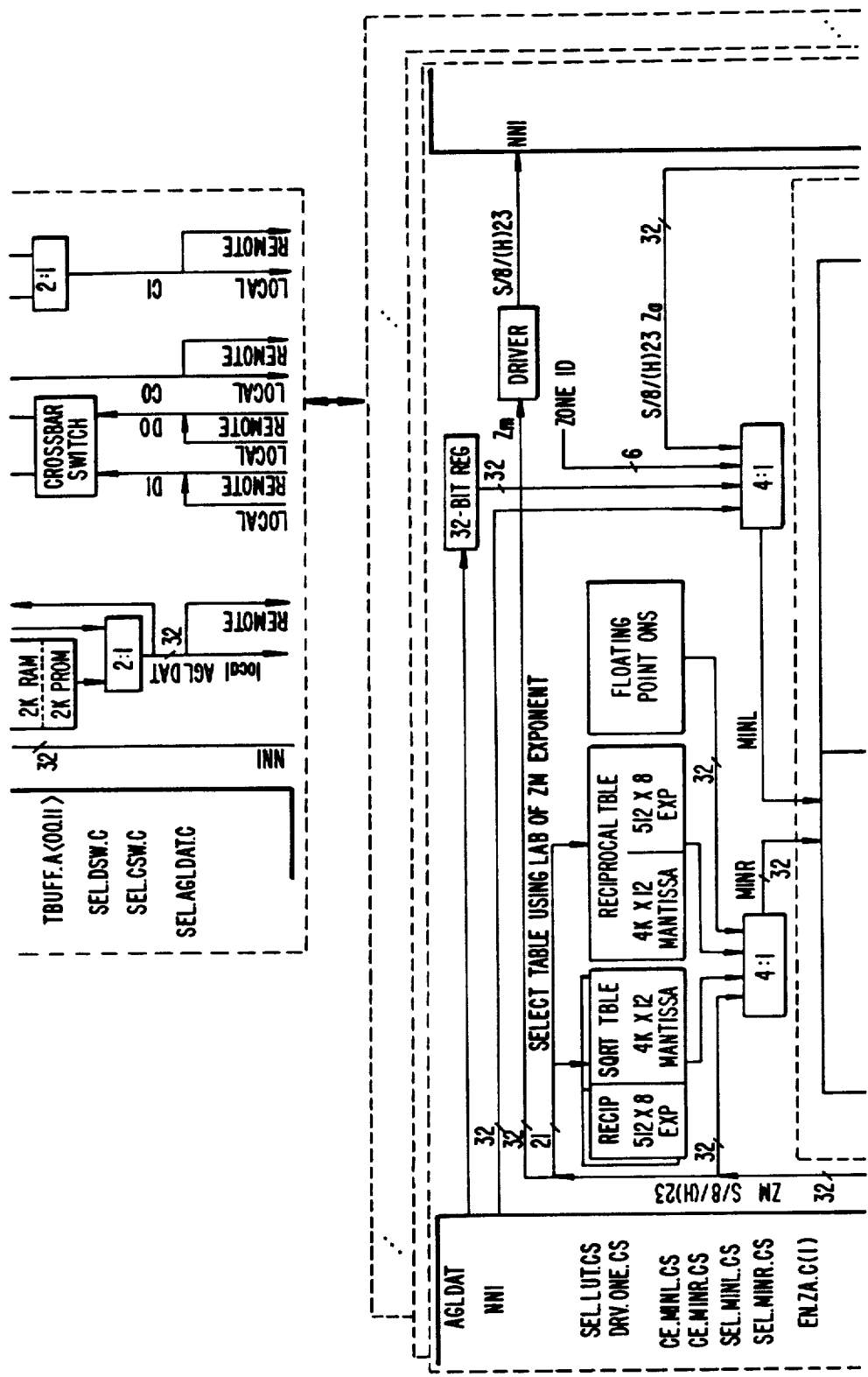
FIG.—19A.

MULTIZONE ARRAY PROCESSOR IMPLEMENTING TWO SIDED ZONE BUFFERS WITH EACH SIDE BEING DYNAMICALLY CONFIGURED AS A WORKING OR I/O SIDE

BACKGROUND OF THE INVENTION

1. Field of the Invention

The invention relates generally to high speed electronic processors and, more particularly, to an electronic processor configured in a parallel architecture.

2. Description of the Relevant Art

The need for a processor able to perform complex mathematical operations on multidimensional data arrays is greatly needed in many scientific fields such as, for example, seismic processing, signal processing, and numerical analysis.

Various mathematical processors exist that have the capability of performing mathematical floating point operations at very high computational rates. In practice, these machines generally do not compute at this high rate while processing arrays of data due to a phenomenon known as "I/O bottleneck."

In a typical computational problem, the data array is stored in an addressable main memory unit. The data in the array must first be fetched from the main memory and routed to the mathematical processor prior to processing. The results of the processor operations must then be routed back to the main memory and stored. These steps of fetching, routing, and storing are generally performed sequentially and are performed at a data I/O rate that is much lower than the computational rate of the processor.

Further, existing high speed mathematical processors generally operate on vectors, i.e., one dimensional sets of points in the data array, during a processing cycle. The data array is composed of a multitude of vectors. Thus, many sequential I/O operations must be performed to retrieve the required vectors from the array, to route these vectors to the mathematical processor, and to store the resultant vectors in the main memory unit.

Accordingly, a high speed mathematical processor that is designed to reduce the I/O bottleneck is greatly needed in many technical disciplines.

SUMMARY OF THE INVENTION

The present invention is a reconfigurable parallel array (RPA) of programmable processing zones. Each zone includes a pipelined mathematical-logical processor (MLP) coupled to a multiported zone buffer.

The programmable MLPs and data paths of the array may be dynamically reconfigured to efficiently perform a variety of sequential mathematical point operations on a data array or set of data arrays.

The present invention eliminates the I/O bottleneck and allows the processor to perform a series of operations on sets of multi-dimensional data arrays utilizing the high-speed computational rate achievable by the processor.

In one embodiment, the array memory includes a working side and a zone I/O side. The array memory is divided into N zones with each zone including a working side buffer and a zone I/O side buffer. Each zone I/O buffer is coupled to a data-in bus and a data out bus. Each working zone buffer has input and output ports coupled to the MLP in the zone. The MLP also has an input coupled to a common data path bus.

During the Ith operation in a series of array operations, the MLP in each zone may utilize data stored on the working side buffer in the zone and provided on the common data bus to perform a series of point operations. Concurrently, the data that will be required to perform the $(I+1)$th operation is preloaded into the zone I/O buffer of each zone via the data-in bus and the results of the $(I-1)$th array operation is downloaded via the data out bus. At the conclusion of the Ith array operation, the working side and zone I/O side of the array memory are interchanged. During the $(I+1)$th array operation, an array operation is performed on the data in the working side buffers that was preloaded during the Ith array operation. Concurrently, the results of the Ith operation presently stored in the zone I/O side of the array memory are downloaded via the data out bus and the array data elements that will be needed for the $(I+2)$th array operation are preloaded into the zone I/O side of the array memory.

The data transfer rates, MLP computational rate, zone I/O and working side zone buffer depths, and array sizes are selected so that the zone array may continually operate at a high computational rate.

According to one aspect of the invention, each zone of the array memory is a double buffered zone memory having first and second sides. The zone buffer may be configured so that one of the sides is a working side (WS) and the other side is an I/O side (IOS).

According to a further aspect of the invention, the WS has Za and Zm output ports and a Zin input port. The IOS has $C_0$ and $C_1$ input ports and $D_0$ and $D_1$ output ports.

According to a further aspect of the invention, the MLP of each zone includes a floating point multiplier followed by a floating point ALU. A multiplier connect circuit connects the first and second inputs to either a common input bus, or the Za and Zm output ports. An ALU connect circuit connects the first and second ALU inputs to either the Za output port or multiplier output port.

According to a further aspect of the invention, the MLP is a pipelined processor that operates on data supplied from the zone buffer and the common input line, performs point operations involving the supplied data, and stores the results of a point operation back in the zone buffer.

According to a further aspect of the invention, a data array $D_{i,j}$ may be stored in the array memory. The i index is defined by the address space in each zone of the RPA. The j index identifies the zone in which the element is stored. For example, the elements $D_{i,j}$ are stored in address locations $L_i$ of zone j.

According to a further aspect of the invention, a single instruction specifying a point operation to be performed by the MLP and a storage location $L_i$ defining the location of a data element involved in the point operation can be provided to a selected set of J zones. If the $D_{i,j}$ stored at the $L_i$ storage location in the selected zones have different values, then each zone will perform the point operation on a different data element. Thus, a single instruction causes multiple data to be operated on simultaneously. A single instruction, multiple data operation (SIMD) provides for simultaneously performing a point operation involving $D_{i,j}, j = 1, \text{--}, J$.

A plane of data is defined in the address space $L_{i,j}$ of the array memory. The RPA can perform a planar operation directly on this defined data array.

According to a further aspect of the invention, a first SIMD instruction causes a selected point operation to be performed on the data element, $D_{i,j}, j=1, --, J$, stored in the zone buffer location addressed by $L_1$. An address generation element causes the address $L_1$ to be incremented by a selected stride value, S, to generate $L_2 = L_1 + S$. This address, $L_2$, is utilized in a second SIMD instruction. This iterative address generation technique is continued until $i=I$.

According to a further aspect of the invention, this iterative address generation technique is utilized to generate the addresses for storage of the results of the point operation.

A block of data may be defined by the address space $L_{i,j,k}$ of the array memory. The RPA can perform a block operation on this defined data array.

According to a further aspect of the invention, a first SIMD instruction causes a selected point operation to be performed on the data element, $D_{i=1,j,k=1}, j=1, --, J$, stored in the zone buffer locations addressed by $L_{i=1,k=1}$. An address generation element causes the address $L_{i=1,k=1}$ to be incremented by a selected stride value, S, to generate $L_{i=2,k=1} = L_{i=1,k=1} + S$. This address, $L_{2,1}$ is utilized in a second SIMD instruction. This iterative technique is continued until $i=I$ for $k=1$ to perform a pass through I for a fixed k.

According to a further aspect of the invention, upon completion of a pass through i, the index k is incremented. Both indices, i and k, are incremented in this nested fashion until $i=I$ and $k=K$.

This block operation is particularly adapted to performing array operations such as, for example, matrix/matrix multiply, FFT, and correlation/convolution at very high throughput rates.

According to a further aspect of the invention, during a block operation a data element stored at location $L_i$ in each zone is transferred to an MLP, a point operation is performed, and the result of the point operation is stored in location $L_i$. This process is repeated as i and k are incremented in the nested fashion. Thus, the data stored in $L_i$ is reused as k is incremented.

According to a further aspect of the invention, two arrays are stored in the planes defined by $L_i$ and $L_k$. The array elements stored in $L_i$ and $L_k$ are transferred to MLP during a point operation and the results of the point operation are stored in $L_i$, for each zone, as i and k are incremented in nested fashion. Thus, the data array stored at $L_i$ and $L_k$ are reused throughout the point operation as i and k are incremented. This reuse of data greatly decreases the need for I/O transfers between the RPA and a main memory. The arrays are loaded into the I/O side before the array operation begins. The sides of the zone buffer are then interchanged so that the I/O side becomes the WS. The array operation then may proceed without any further supply of data to the zone buffer. Thus, while the array operation is proceeding, data for a subsequent array operation may be loaded into the WS and the results of a preceding array operation may be downloaded from the IOS.

According to a further aspect of the invention, a systolic data path can be implemented by utilizing indexed addressing at the zones. Each zone may be configured to increase an address value received at the zone by a selected increment.

According to a further aspect of the invention, the RPA may be configured either as a non-connected SIMD array, an array having a common data path to an I/O port, an array having a common data path from a single port data buffer, and array having connections for performing a nearest neighbor data shift.

This reconfigurability gives the RPA great flexibility for performing different operations at high speed.

According to a further aspect of the invention, the zone buffer can transfer data between the WS and MLP and the IOS and external data sources and sinks during a single clock cycle.

According to a further aspect of the invention, the accuracy of the floating point ALU following a floating point multiplier is increased by performing a second renormalization subsequent to the rounding operation.

Other features and advantages of the invention will become apparent in view of the drawings and following detailed description.

BRIEF DESCRIPTION OF THE DRAWINGS

FIG. 1 is a block diagram of a preferred embodiment.
FIG. 2 is a plan view of a plane of data.
FIG. 2A is a perspective view of a block of data.
FIG. 3 is a schematic diagram of a zone processor.
FIG. 4 is a schematic diagram illustrating a vector array.
FIG. 5 is a schematic diagram of a zone processor configured to perform a point operation.
FIG. 6 is a timing diagram relating to FIG. 5.
FIG. 7 is a schematic diagram illustrating a planar operation.
FIG. 8 is a schematic diagram illustrating a block operation.
FIG. 9 is a register transfer level diagram of a zone processor.
FIG. 10 is a timing diagram illustrating the operation of the circuit of FIG. 9.
FIG. 11 is a block diagram of an address generator.
FIG. 12 is a circuit diagram of a zone buffer.
FIG. 13A is a schematic diagram which depicts an array processor data path configuration.
FIG. 13B depicts an array processor data path configuration.
FIG. 13C depicts an array processor data path configuration.
FIG. 13D depicts an array processor data path configuration.
FIG. 14 is a schematic diagram illustrating an FFT operation.
FIG. 15 is a schematic diagram further illustrating an FFT operation.
FIG. 16 is a diagram illustrating the systolic flow of data.
FIG. 17 is a schematic diagram of an indexed addressing system.
FIG. 18 is a diagram illustrating the performance of a correlation operation.
FIG. 19 is a detailed register transfer diagram of an embodiment of the MLP.
FIG. 20 is a table depicting the steps of a floating point operation.

DETAILED DESCRIPTION OF THE PREFERRED EMBODIMENTS

FIG. 1 is a conceptual depiction of the invention. Referring to FIG. 1, the array memory 10 is divided into N zone buffers 12, with each zone buffer including a working side 14 and an I/O side 15. The array also includes N mathematical-logical processors (MLP) 16 with each MLP 16 having an output port coupled to an input port of a respective working side 14, of zone buffer. Each MLP 16 has two input ports coupled to $Z_1$ and $Z_2$ output pores of the respective working side zone buffer 12, and has a common data port coupled to a common data bus 18. Each MLP also has a data input path 18a connected to the working side zone buffer of the zone immediately to its left.

The reconfigurable processing array RPA is a synchronous machine with elementary processor operations performed during an RPA clock cycle defined by an RPA clock 20. The connections between the RPA clock and the various elements of the RPA are standard and not depicted in detail in FIG. 1.

The I/O side 15 of each zone buffer 12 has two data out ports D0 and D1 coupled to data-out buses 22a and b, and two data-in ports C0 and C1 coupled to data-in buses 24a and b. The common data bus 18 receives data from a first external data source 26. The data-in buses 24 are coupled to a second external data source 28 and the data-out buses 22 are connected to an external data sink 30. These data sources and sinks function as a machine I/O interface (MIO). The MLP of zone 0 also has an input via a data path 19a coupled to the first internal data source 26. The last zone buffer also has a return path 19b coupled back to data source 26, which may also serve as a data sink.

MLP control signals 32 and array memory address and control signals 34 are provided in programmable sequences to perform operations on data arrays. The address and control signals 34 include signals for interchanging the working and I/O sides 14 and 15 of the array memory 10. The MLP control signals 32 select which input ports of the MLP are to receive data and the order of mathematical and logical operations performed on the data.

The array memory 10 is designed to store data in three dimensions depicted by the I, J, and K axes 36. FIG. 2 is a depiction of a plane of data points, B(i,j) with $i = 1, \ldots I$; and $j = 1, \ldots J$. For a given data point B(i,j), the jth coordinate is determined during a data preload operation. A data point having a given j coordinate is preloaded into the jth zone. The i and k coordinates of a data point are defined by I and K address fields specifying selected storage locations in the zone buffer 12. For example, a vector B(i) in a given zone is a set of numbers preloaded into the storage locations of the given zone buffer accessed by a set of addresses L1(i).

The elements of the vector may be accessed from the zone buffer 14 by applying the addresses L1(i) over a period of RPA clock cycles.

As depicted in FIG. 2, if these addresses, L1(i) are supplied to each zone buffer for $j = 1, \ldots J$, then a plane of data points, B(i,j), is defined as the addresses in the set L1(i) are generated over a series of MPU clock cycles.

FIG. 2A depicts a three-dimensional block of data D(i,j,k). The address fields for the indices i and k are incremented in nested fashion, while the index j is determined by which zone the data resides in.

FIG. 3 is a more detailed block diagram of an MLP 16 and associated signal generating circuitry. Referring now to FIG. 3, the working side buffer 14 includes Za and Zm output ports coupled to Za and Zm buses 50 and 52. A multiplier connect circuit 54 has a common input port 54a to the common data line 18, Za and Zm input ports 54b and c coupled to the Za and Zm data buses 50 and 52, and a left neighbor input port 54d. The multiplier connect circuit 54 also has a right neighbor output 54e and left and right output ports 54f and g. The multiplier connect circuit selectively connects any one of the input ports with any one of the output ports.

A multiplier 56 has left and right input ports (MINL and MINR) 56A and 56B coupled to the output ports 54f and g of the multiplier connect circuit 54. The multiplier has a single output port 56C.

An ALU connect circuit 58 has input ports coupled to the multiplier output port 56C and the Za data bus 50. The ALU connect circuit 58 has left and right output ports.

An ALU 60 has a left input port 60A and a right input port 60b coupled o the left and right output ports of the ALU connect circuit 58. The output port 60C of the ALU 60 is coupled via data bus 61 to the Zin input port of the working side buffer 14.

The multiplier connect 54 has a control signal input port coupled to a multiplier connect control signal generator 62 via delay element 64. The multiplier 56 has a control input port coupled to a multiplier control signal generator 66 via delay 68. The ALU connect circuit 58 has a control port coupled to an ALU connect control signal generator 70 via delay 72. The ALU 60 has a control port coupled to the ALU control signal generator 74 via delay element 76. The zone buffer 12 has an address and control signal port coupled to a buffer address and control signal generator 78 via delay 80. The MLP control fields 32A, 32B, 32C and 32D together with the address and control field 34 comprise a machine instruction field (MINST). The MINST control and address generating field are formed externally and provided to the various signal generator circuits. These generators functions as a machine controller (MCO).

The delays introduced by the delay elements 64, 68, 72, 76 and 80 do no change from one MINST to the next. They differ from each other, however, by an amount equal to the pipeline delay between the computation stages which are controlled by their respective control and address fields.

The use of the aforementioned delay elements simplifies the job of programming the RPA. The programmer may define a MINST in terms of the logical correctness of its control and address fields, without any concern for timing, knowing that the appropriate delays will be generated automatically. Control and address collisions are avoided automatically in the system used in this invention. Thus, overlapping pipelined operations are simply programmed as a succession of MINST's.

The performance of a vector operation in the jth zone 12 of the array memory 10 will now be described with reference to FIG. 4. In FIG. 4, the vector $\overline{D}$ is stored at locations L0 (i,i=1, ... 15) and a scalar B is stored at locations L1. The elements of the vector X are provided to the processor via the common data path 18. For each element of a vector calculated, a point operation is defined. The data paths and MLP 16 can be configured to perform a catalog of point operations. The configuration is selected by program control, and the catalog of point operations is expandable by means of microcode to provide new combinations of MINST field parameters. To understand the operation of the invention, however, a single point operation will now be described.

The point operation to be performed is defined by the equation:

$$\overline{D}(final) = \overline{X} \cdot B + \overline{D}(initial) \qquad \text{EQUATION 1}$$

or, $$L0(i) = X(i)*L1 + L0(i, \text{ initial})  \quad \text{EQUATION 2}$$

In equation 1, the operation is defined in terms of the elements of the vectors and in equation 2 the operation is defined in terms of the address space of the memory elements where the vector elements are stored.

In the vector operation defined above, the product of the vector $\overline{X}$ multiplied by the scalar B is first performed. Next this product is added to the initial values of the vector $\overline{D}$. Finally, the initial values of the elements $\overline{D}$ stored in the address space L0, are replaced by the sum defined above.

FIG. 5 is a schematic diagram of the configuration of a zone for performing the point operation defined in equations 1 and 2. The vectors $\overline{X}$ and $\overline{D}$ both have fifteen elements and the complete vector operation requires fifteen point operations. A point operation is performed during a point operation cycle where each point operation cycle requires several MPU cycles to complete.

Referring now to FIG. 5, the multiplier and ALU connect circuits 54 and 58 are not shown, instead, the memory output ports are shown linked directly to the multiplier 56 and ALU 60 input ports. The actual mechanisms for performing these connections are described more fully below.

From Table 1, it is seen that even though the computation of any one element D(i) takes 14 clock cycles, a new result is being output for RPA clock cycle.

Table 1 illustrates a vector operation. Note that a point operation is defined for parameters X(i), D(i) and D(i) referring to corresponding addresses, even though the timing of their use is different.

In Table 1, D'(i) stands for the recomputed value while D(i) is the initial value. Notice the distinction between computing the various steps of any given operation, and the computations of several different point operations occurring at any given time.

Thus, in commuting the result D(3): the multiplicands X(3) and B are entering the multiplier at clock cycle 3; their product X(3)*B and the old value D(3) are entering the ALU at RPA clock cycle 9; and finally, the new result D(3)' is being stored in the zone buffer at clock cycle 16.

On the other hand, several different things that are happening at RPA clock cycle 14. At that instant: the multiplicands X(14) and B are entering the multiplier; also at the same time; the product of X(8) and B is just entering the left hand side of the ALU while D(8) is entering the right hand side; simultaneous with the above operations, the value D(1)' which has completed all its steps, is being stored in the zone buffer where D(1) had resided before.

The execution of the above defined vector operation will now be described: firstly, in terms of the data and operations that go into the computation of one result point, and secondly, in terms of pipelined data flow. Table 1 is a chart showing the RPA clock cycles involved the pipelined recomputation of the fifteen elements of D(i).

As an example, consider the computations which produce one point D(i) of the vector $\overline{D}$. In the vector operation defined above, the product of the vector element X(i) multiplied by the scalar B is first performed. Next, this product is added to the initial value of the element D(i). Finally, the initial value of the element D(i) is replaced by the sum defined in Equations 1 and 2 above. This process is illustrated in FIG. 6.

TABLE 1

| | | | | | | |
|---|---|---|---|---|---|---|
| | | | $D(i)' = X(i)*B + D(i)$, pipelined | | | |
| RPA CLOCK | MULT L | INPUTS R | ALU L | INPUTS R | ZONE OUTPUT(ZA) | BUFFER INPUT(ZIN) |
| 1 | X(1) | B | | | | |
| 2 | X(2) | B | | | | |
| 3 | X(3) | B | | | | |
| 4 | X(4) | B | | | | |
| 5 | X(5) | B | | | | |
| 6 | X(6) | B | | | | |
| 7 | X(7) | B | X(1)*B | D(1) | D(1) | |
| 8 | X(8) | B | X(2)*B | D(2) | D(2) | |
| 9 | X(9) | B | X(3)*B | D(3) | D(3) | |
| 10 | X(10) | B | X(4)*B | D(4) | D(4) | |
| 11 | X(11) | B | X(5)*B | D(5) | D(5) | |
| 12 | X(12) | B | X(6)*B | D(6) | D(6) | |
| 13 | X(13) | B | X(7)*B | D(7) | D(7) | |
| 14 | X(14) | B | X(8)*B | D(8) | D(8) | D(1)'(=X(1)*B+D(1)) |
| 15 | X(15) | B | X(9)*B | D(9) | D(9) | D(2)'(=X(2)*B+D(2)) |
| 16 | | | X(10) | D(10) | D(10) | D(3)'(=X(3)*B+D(3)) |
| 17 | | | X(11) | D(11) | D(11) | D(4)'(=X(4)*B+D(4)) |
| 18 | | | X(12) | D(12) | D(12) | D(5)'(=X(5)*B+D(5)) |
| 19 | | | X(13) | D(13) | D(13) | D(6)'(=X(6)*B+D(5)) |
| 20 | | | X(14) | D(14) | D(14) | D(7)'(=X(7)*B+D(7)) |
| 21 | | | X(15) | D(15) | D(15) | D(8)'(=X(8)*B+D(8)) |
| 22 | | | | | | D(9)'(=X(9)*B+D(9)) |
| 23 | | | | | | D(10)'(=X(10)*B+D(10)) |
| 24 | | | | | | D(11)'(=X(11)*B+D(11)) |
| 25 | | | | | | D(12)'(=X(12)*B+D(12)) |
| | | | | | | D(13)'(=X(13)*B+D(13)) |
| | | | | | | D(14)'(=X(14)*B+D(14)) |
| | | | | | | D(15)'(=X(15)*B+D(15)) |

A planar operation will now be described. A planar operation illustrates the capability of the RPA (reconfigurable processing array) of the present invention to define a data array in the working side of the array memory and operate on the entire array during a single machine instruction cycle. FIG. 7 depicts the array configuration for performing the point operation of equations 1 and 2 with the vector $D_i$ replaced by the array $Y_{i,j}$ with $i=1, \ldots, M$ and $j=1, \ldots, N$ where I is less than M and $J \leq N$. The quantity N is the total number of zones in the array, for example, 32. The array is comprised of a plurality of zones, each zone including an MLP 16 and a zone buffer 12. The RPA may be configured in a single instruction multiple data (SIMD) configuration where the control and addresses are the same for all of the zones. Thus, all of the zones perform the same operation, at the same time, on data stored in the same storage elements in the zone buffers of each respective zone. However, the elements in the same address space in each zone buffer are not necessarily the same. For example, the element $Y_{1,1}$ stored in the storage location $L0_1$ of zone 1 is not the same as the element $Y_{1,2}$ stored in the storage element $L0_1$ of zone 2. Thus, the single instruction causes all of the zones to perform the same operation on different data.

The only working side control signal that shall differ from zone to zone is the direct enable signal for the zone buffer. Each zone buffer receives its own enable signal from the buffer address and control signal generator 78 of FIG. 3. If a zone buffer enable signal is not asserted, the corresponding MLP 16 in the zone shall operate just like an enabled zone but data will not be transferred from the MLP to the zone buffer.

Similarly, by defining the address space of $L0_i$, the number of rows in the subarray can be selected.

Referring now to FIG. 7 and the timing diagram of FIG. 6, during the first interval the address $L1_i$ where $i=1$ is provided to each zone buffer. In each zone the data stored in a storage location addressed by L1, $B_1$ is transferred to the input of the multiplier 56 and the element $X_1$ of the vector $\overline{X}$ is transferred to the other input of the multiplier via the common line 18. The product is formed and transferred to one input of the ALU 60. The address $L0_1$ is provided to each zone and the elements of the first row in the $\overline{Y}$ are provided to the ALUs of the MLPs in each zone. The sum is then formed and transferred to the $L0_1$ addressed storage location in each zone. The index i is incremented after each point operation cycle and the initial array stored in the data plane is replaced by the final array defined by the point operation.

The results of a planar operation utilizing the point operation of Equations 1 and 2, where $I=6$, $J=12$, is set forth in Table 2.

TABLE 2

| | | |
|---|---|---|
| $i = 1$ | $Y_{1,1}(\text{final}) = Y_{1,1}(\text{initial}) + X_{i=1}B_{j=1}$ | $\ldots Y_{1,12}(\text{final}) = Y_{1,12}(\text{initial}) + X_{i=1}B_{j=12}$ |
| . | . | |
| . | . | |
| $i = 6$ | $Y_{6,1}(\text{final}) = Y_{6,1}(\text{initial}) + X_{i=6}B_{j=1}$ | $\ldots Y_{6,12}(\text{final}) = Y_{6,12}(\text{initial}) + X_{i=6}B_{j=12}$ |

A box operation will now be described. In a box operation, both the i and k indices are incremented. The box operation to be described utilizes the arrays depicted in FIG. 8 and the point operation of equations 1 and 2. At the conclusion of the box operation the matrix product of the X and B arrays will be stored in the Y array. The processor array of the present invention is able to continually perform matrix multiplication operations at a very high throughput rate.

The performance of the matrix/matrix multiply operation is most easily understood with reference to FIGS. 5, 6, 8, and to Table 3 on the next page. Table 3 sets out the results of each successive point operations as the indices k and i are incremented where $I=6$, $J=12$, and $K=4$. Details relating to the actual incrementation of i and k indices will be provided more fully in the following description of Table 3.

TABLE 3

| | | k = 1 | |
|---|---|---|---|
| $i = 1$ | $Y_{1,1} = X_{1,1}B_{1,1}$ | $\ldots$ | $Y_{1,12} = X_{1,1}B_{1,2}$ |
| . | . | | . |
| . | . | | . |
| $i = 6$ | $Y_{6,1} = X_{6,1}B_{1,1}$ | $\ldots$ | $Y_{6,12} = X_{6,1}B_{1,12}$ |
| | | k = 2 | |
| $i = 1$ | $Y_{1,1} = X_{1,1}B_{1,1} + X_{1,2}B_{1,2}$ | $\ldots$ | $Y_{1,12} = X_{1,1}B_{1,12} + X_{1,2}B_{1,12}$ |
| . | . | | . |
| . | . | | . |
| $i = 6$ | $Y_{6,1} = X_{6,1}B_{1,1} + X_{6,2}B_{2,1}$ | $\ldots$ | $Y_{6,12} = X_{6,1}B_{1,12} + X_{6,2}B_{2,12}$ |
| | | k = 3 | |
| | | . | |
| | | . | |
| | | k = 4 | |
| $i = 1$ | $Y_{1,1} = X_{1,1}B_{1,1} + X_{1,2}B_{2,1} + X_{1,3}B_{3,1} + X_{1,4}B_{4,1} \ldots$ | | |
| . | | | |
| $i = 6$ | . | | $Y_{6,12} = X_{6,1}B_{1,12} + X_{6,2}B_{2,12} + X_{6,3}B_{3,12} + X_{6,4}B_{4,12}$ |

In Table 3, the indices k and i are set equal to 1 and the address $L1_1$ is provided to each zone buffer. The element $X_{11}$ of the X array is placed on the common data path. Prior to the beginning of the operation, the storage locations of the Y array are all cleared and contain the value 0. The multiplier forms the product of $X_{11}$ and the element stored in the storage element addressed by $L_{11}$ in each zone. In zone 1 this element is $B_{11}$; in zone 2 this element is $B_{12}$, etc. The product is added to the element stored in the storage location addressed by $L0_1$ in each zone buffer. As previously stated, this storage element is 0. Thus the product is equal to $X_{11}$ multiplied by the element stored in the $L_{11}$ storage element of each zone. The elements of the first row of the Y matrix are set forth in the $k=1$, $i=1$, row of the table. The index i is then incremented to 2 while the index k is held at 1. The second element in the first column of the X matrix, $X_{21}$ is placed on the common data path. The second row of the Y matrix is then formed as described above, with the result listed in the second row of the table. This product is added to the element stored in location $L0_2$ (which is 0 at this point), and the result stored back in $L0_2$. The i index is incremented, step by step, to 6, while the k index is held at 1. The results of the first pass through i, for k=1, are set forth in Table 3.

The index k is then incremented to 2 and another pass is made through the index i. Note that the values of the elements stored in the Y array are as set forth in the table for k=1. With k=2 and i=1, the element $X_{12}$ is placed on the common data path. The product of $X_{12}$ and of the elements stored in the $L1_2$ address storage location in each zone buffer is then formed by the multiplier. This product is then added to the elements stored in the $L0_1$ address storage element in each zone buffer. The results of the second pass through i for k=2 are depicted in the table. The index k is then incremented to 3 and another pass is made through i. Finally k is incremented to 4 and a final pass through i is made. The results of these passes are partially listed in the table. Note that at the completion of the pass through i for k=4 the elements stored in the Y array are equal to the elements of the product of the matrices X and B.

The above example illustrates several advantages of the Reconfigurable Processor Array (RPA) of the present invention. Note that the B array data, stored in the array buffer, was reused k times during the matrix/matrix multiply operation. The only external data supplied during the operation are the elements of the C matrix. Only one external data element need be provided for each point operation cycle. Next, a single instruction signal set causes J point operations to be performed utilizing J different elements of the B matrix. Finally, a single instruction signal set causes the result of the J point operations to be stored in J different locations of the array memory. The memory elements defined by the L0 address field are utilized to accumulate the products of the X and B element product terms formed during the matrix/matrix multiply operation.

FIG. 9 is a detailed circuit diagram of an MLP 16. The registers and switches of the multiplier connect 54 and ALU connect 58 (FIG. 3) are depicted in detail along with control signals for configuring the data paths. Several features are depicted in FIG. 9 that are not included in FIG. 3. Note, for example, look-up tables 100 and 102 are coupled to the Za and Zm lines 52, 55. Additionally, an index register 104 is positioned between the address buffers and the working side zone buffer. The function of these elements will be described below. The zone buffer 12 is divided into first and second sides which may be swapped to form the working side 14 and the I/O side 15. Each side is comprised of left and right leaves.

Table 4 is a descriptive list for the control signals depicted on FIG. 9. The functions of many of the signals are self-explanatory. The function of all of the signals will become more apparent in the discussion that follows.

TABLE 4

| | |
|---|---|
| SEL.ASOUT | common output select |
| SEL.LUT | lookup table select |
| SEL.MINL | left multiplier input mux select |

TABLE 4-continued

| | |
|---|---|
| SEL.MINR | right multiplier input mux select |
| CE.MINL | left multiplier input register load enable |
| CE.MINR | right multiplier input register load enable |
| DRV.ONE | drive "1" command to look up table |
| EN.MSTAT | multiplier status enable |
| SEL.AINL | left ALU input mux select |
| SEL.AINR | right ALU input mux select |
| CE.AINLM | left ALU input multiplier reg load enable |
| CE.AINRM | right ALU input multiplier reg load enable |
| CE.AINLZ | left ALU input zone reg load enable |
| CE.AINRZ | right ALU input zone reg load enable |
| F.ALU.[0:4] | ALU function select |
| F.CMP.[0:3] | ALU comparison function select |
| SEL.WRND | ALU rounder width select |
| EN.ASTAT | ALU status enable |
| SEL.NWORD | zone I/O buffer # words/access select |
| SEL.ZAX | SEL ZA addr port indexed access |
| SEL.ZMX | SEL ZM addr port indexed access |
| SEL.ZINX | SEL ZIN addr port indexed access |
| CE.IX | index register load enable |
| EWE.WBUFF | working buffer Zin port write enable |
| EWE.ZIO | zone I/O buffer write enables |
| EN.ZW.C[00:31] | direct working zone enables |
| EN.ZIO.C[00:31] | direct zone I/O buffer enables |
| ANN.INV | produce 0 result if one mult. input is zero and the other is invalid |
| EN.ZAR | ZA port access enable |
| EN.ZMR | ZM port access enable |
| SEL.BTYPE | Select buffer type, single or double |
| ZA.AG<00:11> | ZA address |
| ZM.AG<00:11> | ZM address |
| ZIN.AG<00:11> | ZIN port address |
| CD.AG<00:11> | C & D port address |

The multiplier interconnect 54 includes first and second lookup tables LUTS 100 and 102, first and second 4:1M multiplexers 105 and 106, and MINR and MINL registers 108 and 110. The loading of the registers and the switching of the MUX's is determined by signals included in the MULT CNCT control field (32a in FIG. 3). The right multiplier input, MINR, 56b is chosen from four sources: the most significant 32 bits of the 40 bit Zm port of the zone buffer, the output of the lookup tables 100 or 102 and a third LUT which supplies the value floating point one, when the DRV 1 signal is asserted. The left input, MINL, 56a, is also chosen from four sources: the 32 bit common data path 18, floating point j for zone j, a data path from its left neighbor, and the most significant 32 bits of the 40 bit Za port of the zone buffer. The election of MINR input by second M-MUX 106 is controlled by the SEL-LUT, SEL-MINR, and DRV-ONE signals. The selection of the MINL input by the first M-MUX 105 is controlled by the MINL signal.

The lookup tables receive their seed value from the most significant 32 bits of the 40 bit Zm port of the zone buffer.

The selection of the lookup table is being controlled by SEL-LUT signal. The reciprocal and reciprocal square root first guess for the Newton iteration loop are generated to a 12 fractional bit accuracy. The exponent correction for each is also handled in the lookup table.

The ALU connect circuit 58 includes AINLZ, AINLM, AINRM, and AINRZ registers 112, 114, 116, and 118. The inputs of the AINLM and AINRM register 114 and 116 are coupled to the multiplier output 56c.

The inputs of the AINLZ and AINRZ registers 112 and 118 are coupled to the Za bus 50.

The outputs of the AINLZ and AINLM register 112 and 114 are coupled to the inputs of AINL MUX 120. The output of AINL MUX 120 is coupled to the left input, AINL, 60a of the ALU 60.

The outputs of the AINRZ and AINRM registers 116 and 118 are coupled to the inputs of the AINR MUX 122. The output of the AINR MUX 122 is coupled to the right input, AINR, 60b of the ALU 60. These AIN registers 112, 114, 116, 118 can only be loaded if their respective clock enable is asserted and if the working side 15 of the zone is enabled in order to protect stored data of importance. Independent registers are required for efficiently doing complex arithmetic and other specialized operations.

The multiplier 56 receives two 32 bit floating point input from the multiplier 54 every MPU clock cycle.

It produces a 40 bit normalized floating point result every clock cycle that is sent to the ALU interconnect 58. The least significant 16 bits out of the full 48 bit fraction product is truncated. The multiplier 56 supports floating point arithmetic.

The ALU 60 receives two 40 bit floating point inputs from the ALU interconnect 58. The ALU 60 produces one 40 bit normalized floating point result rounded to 40 bits or rounded to 32 bits with eight trailing zeros. The ALU control signals control the selection of which of these two output formats the ALU 60 shall produce. The output format can be changed for each ALU output. Two inputs can be received and an output can be produced every MPU clock cycle.

The computational functionality of the ALU is determined by the control logic burned into a PAL. Basically the control logic can manipulate the left or right input, or the output by the following 5 means (1) set sign +
(2) set sign −
(3) invert sign
(4) set value to 0
(5) leave sign as is This give possibility of 125 different combinations. The initial set used, however, is 1. $\pm L \pm R$
2. $\pm |\pm L + R|$
3. $\pm L$
4. $\pm |L|$ where L and left and right ALU inputs, respectively.

The ALU 60 has two output modes: computational and logical. In the computational mode, the result of the arithmetic computation is sent to the Zin buffer port. In a logical mode, the result of the logical comparison function is sent to the Zin buffer port.

There are at least six binary logical comparison functions including but not necessarily limited to the initial list below. The output is a floating point 1 if the comparison is true else the output is a floating point 0. These functions produce a logical output based on the computed arithmetic result, R as shown below.

(1) R is equal to 0
(2) R is either greater than or less than 0
(3) R is less than 0
(4) R is less than or equal to 0
(5) R is greater than 0
(6) R is greater than or equal to 0

There is also be a signum function with an output is based on the following comparisons.

output = +1, if R is greater than 0
output = 0, if R = 0
output = −1, if R is less than 0

Another ALU function is the sign function, the output of which is given by:

output = +1 if $R \geq 0$
output = −1 if $R < 0$

Other functions may be programmed into unused PROM space. Possibilities include:

output = 1 for R "invalid"
output = 0 otherwise
output = 0 for R "invalid"
output = R for R "valid"

If an overflow or an invalid input occurs during a logical operation, the output is the invalid output and the non-zero status is asserted. If an underflow occurs during a logical operation, the result of the logical operation is based on the arithmetic result R = 0.

The MLP 16 depicted in FIG. 9 is a pipeline processor that performs a MINST in a pipeline fashion. FIG. 10 is a timing diagram of the pipeline process. Each pipeline process occurs over 16 RPA clock cycles or pipeline stages. However, after initiation of the point operation, a pipeline output will be directed to the working side buffer input port, Zin, each MPU clock cycle.

The delays 64, 68, 72, 76, and 80 (FIG. 3) function as a synchronized delay that adjusts the timing of the arrival of these control signals to the zone MLPs and buffers during each pipeline stage. This synchronous delay line is under control of the RPA clock 30.

As illustrated above, a single point operation is repeated I*K times in each zone to complete the multiplication of an I*K matrix by one of size K*J. I*K can range up to 1K. However, one control field of the MINST defining a set of control signals is reused to perform each of the point operations involved.

By varying these control signals provided in the MINST, a catalog of point operations may be performed. The single precision operations are listed in Table 5. The complex vector/vector operations are listed in Table 6. The terms, L0, L1, and L2 represent address spaces for vectors defined in the working side buffer. A and T are data inputs provided on the common data path.

TABLE 5

| Single Precision VX plus Y | | | |
|---|---|---|---|
| L0 | = | $\pm$ L1*L2 | |
| L0 | = | $\pm$ L1 | |
| L0 | = | $\pm$ 1 | $\pm$L1 |
| L0 | = | $\pm$ L1 $\pm$L2 | |
| L0 | = | $\pm$ 1 | |
| L0 | = | $\pm$ A*L1 | $\pm$L2 |
| L0 | = | $\pm$ A*L1 | |
| L0 | = | $\pm$ A | $\pm$L1 |
| L0 | = | $\pm$ A | |
| L0 | = | $\pm$ L1*L2 | $\pm$A |
| L0 | = | $\pm$ T*L0 | $\pm$L1 |
| L0 | = | $\pm$ T*L1 | $\pm$L0 |
| L0 | = | $\pm$ T*L1 | |
| L0 | = | $\pm$ T | $\pm$L1 |
| L0 | = | $\pm$ T | |
| L0 | = | $\pm$ L0*L1 | $\pm$T |

Some point operations require more than one MINST to complete. For instance, the point operation given by:

$$L0 = \pm L1*L2 + A$$

may be broken into $AIN.LM = L1*L2$ $L0 = A*1 + AIN.LM$ where AIN.LM is ALU latch 114 on FIG. 9.

TABLE 6

| CVVM - Complex (vector/vector multiply) | | | | |
|---|---|---|---|---|
| L0 | := | + | L1*L2 | − | $\overline{L1}*\overline{L2}$ |
| $\overline{L0}$ | := | + | L1*L2 | + | $\overline{L1}*\overline{L2}$ |
| L0 | := | + | T*L1 | − | $\overline{T}*\overline{L1}$ |
| $\overline{L0}$ | := | + | T*L1 | + | $\overline{T}*\overline{L1}$ |
| SUMDIF - (vector summation−difference : fft) | | | | |
| L0 | := | + | L0 + L1 | |
| L1 | := | + | L0 − L1 | |
| CSUMDIF - (complex vector summation−difference : fft) | | | | |
| L0 | := | + | L0 + L1 | |
| L1 | := | + | L0 − L1 | |
| $\overline{L0}$ | := | + | $\overline{L0} + \overline{L1}$ | |
| $\overline{L1}$ | := | + | $\overline{L0} − \overline{L1}$ | |
| XCHNG - (element exchange : fft) | | | | |
| L0 | := | + | L1 | |
| L1 | := | + | L0 | |
| WIDEBF - (wide butterfly [CVMM & CSUMDIF] : fft) | | | | |
| L0 | := | + | T*L1 − $\overline{T}*\overline{L1}$ | |
| L0 | := | + | T*L1 + $\overline{T}*\overline{L1}$ | |
| (wait for results to propagate through ALU) | | | | |
| L0 | := | + | L0 | + | L1 |
| L1 := | + | L0 | − | L1 |
| $\overline{L0}$ | := | + | L0 | + | $\overline{L1}$ |
| $\overline{L1}$ | := | + | L0 | − | $\overline{L1}$ |

As illustrated in the matrix/matrix multiply, the vector addresses, $L0_i$ and $L1_k$, provided to working side buffers 14, must be incremented in a nested fashion. This incrementation is done by the BUFFER ADR and CSIG GEN 78 (FIG. 3). FIG. 11 is a block diagram of an embodiment of this generator 78.

Referring to FIG. 11, the address generator 78 includes inputs for receiving sections of address field specifying a start address and a stride. The address signals at the output, $Z_1$, are a sequence of addresses $L_i$. $L_1$ is equal to the starting address. Each succeeding Li is incremented by the stride. This incrementation is continued under control of a first counter 200 until i=I and a planar operation, defined over I and J, is completed. If a box operation is to be performed, a second counter 202 increments k at the end of each planar operation until k=K. The parameters I and K are supplied to the first and second counters 200 and 202 via the ADR control field.

The address generator also includes a 3 bit interplanar address modification (IPAM) field. At the end of a kth planar operation in a box operation, this field may be utilized to modify the start address for the (k+1)th planar operation.

A more detailed description of address generation during planar and box operations is included in Appendix A.

FIG. 12 is a detailed schematic circuit diagram of a zone buffer 12. The zone buffer is implemented utilizing four two-port random access memory (RAM) modules 250. These modules are denoted R0, L0, R1, and L1. The zone buffer 12 is configured to provide a virtual multiple port memory utilizing the control and address signals shown. A control logic and status generator 255 provides select signals to MUXs M1–M12 to route data as described below. The zone buffer has only four address ports for receiving address signals, ZA, the ZA address port 260, ZM, ZM address port 262, ZIN.AS, Zin address port 264, and CD.AS, C and D address port 266. The zone buffer supports one data input from the ALU 60 via the Zin input, one data output to the multiplier interconnect 54 and to its nearest neighbor zone on the right via the Zm output port, one data output to the ALU interconnect and the multiplier interconnect via the Za port during an MPU clock cycle. The zone buffer 12 also supports four data paths to and from external data sources via the C0, C1, D0, and D1 external data paths 24 and 22. The sides of the zone buffer comprise the R0 and L0 RAM modules 150, the zero side, and the R1 and L1 RAM modules 150, the one side. Each side is composed of left and right leaves, e.g., the zero side has leaves R0 and L0, and the one side has leaves R1 and L1.

On the working side 14 there is one address path, Zin, which is addressed and multiplexed to any one of the four RAM modules 250. RAM module 250 selection is via bits 11 and 10 of the ZIN.AS address signal and other control signals EN.ZW and RWE.ZW directed to the write enable logic 252.

The WS output ports, Za and Zm, are coupled to the left and right leaves of the working side by En.Za and En.Zm signals and control bits in the Za and Zm addresses. Either of the leaves, the right or left, may be coupled to either WS output port, Za or Zm.

On the I/O side, there are four data paths and one address path. These paths are multiplexed and addressed as shown in FIG. 12. The working side buffer 14 supports one write and two read operations every MPU clock cycle. The two read cycles are possible due to the two leads in the working side bank.

The Zin port connects to either or both leaves of the working side and either leaf can write a value from this port. For a write to occur, the zone must be enabled and the working buffer write enable control line must be asserted. In a preferred embodiment, each leaf is 40 bits wide and 1024 words deep. When a side is in the I/O side of the buffer, the right leaf can be written from and read to the C0 and D0 data ports, respectively. The left leaf can be written from and read to the C1 and D1 data ports, respectively. Thus, the zone array is a space and time multiplexed system.

The operation of the MLP and zone buffer are described in further detail in Appendix B.

FIGS. 13A through 13D illustrate four possible working side I/O configurations for the processor array. Referring to FIG. 13A, the array MLPs 16 are configured as a non-connected SIMD array. Note that the multiplier inputs are coupled to the Za and Zm ports of the working side buffer 14 and there is no connection to a common data path. Referring now to FIG. 13B, an array configuration is shown with a multiplier input connected to the common data path 18. In FIG. 13C, a single port data buffer (T buffer) 300 has one port coupled to the common data path 18 and a second port coupled to the first external I/O source/sink 26. One of the multiplier inputs is coupled to the common data path 18. In FIG. 13D the array depicted is in a nearest neighbor data shift configuration. The first MLP 16 in the array has one input of the multiplier 56 coupled to the first external data source 26. The Zm port of the working side buffer in the first zone is coupled to the multiplier input of the MLP in the second zone. The Zm port for the working side buffer in each zone is coupled to the multiplier input of the MLP in the next zone. The last zone of the array has a multiplier input coupled to the Zm port of the working side buffer in the preceding zone and a Zm port coupled via the return path 302, to the first external data sink 26.

In the nearest neighbor configuration, zone 1 receives an input from zone 0, zone 2 receives an input from zone 1, and so on up to zone 31 which receives an input from zone 30, and provides an input to zone 0.

FFT

Introduction

An FFT is a method for computing the Discrete Fourier transform of a finite length complex data vector. It proceeds by choosing pairs of complex elements X, Y from the data vector and replacing X with $X+W^P Y$ and Y with $X-W^P Y$; where $W^P$ is a complex number of the form $(\cos U + j \sin Y)^P$. This process of recomputing a single pair X and Y, is called a butterfly.

In the the RPA, the $W^P$ values are initially stored in the TBUF 300, and the data vector in the zone buffer. The multiple pass computation of the FFT of a data vector containing 16 points may be represented by the signal flow graph included in FIG. 14. Several aspects of the RPA computation of FFTs will be demonstrated:
1. the Cooley-Tukey Algorithm for FFT;
2. how the butterfly elements are addressed within the data vector;
3. how the computations are sequenced as a series of RPA box operations;
4. how the exponent of W is chosen for each group of adjacent butterflies; and,
5. performance of the RPA on FFTs.

The FFT Algorithm

The frequency dependence of a finite time series may be expressed by means of the discrete Fourier Transform (DFT):

$$X(n) = \sum_{k=0}^{N-1} W^{nk} x_0(k) \qquad \text{Eq. 3}$$

where:

$W = Exp(-j(2\pi/N))$;

k references time $k\Delta T$;

$N\Delta T$ is the total time interval; and, n references frequency $n/N\Delta T$.

The FFT is an algorithm that reduces the number of complex operations to compute a DFT from order $N^2$ to order $N \log_2 N$. In the Cooley-Tukey Algorithm the sum over k is broken into a set of nested sums, each over one bit of a binary representation of k.

$X(n) = \qquad \text{Eq. 4}$ $$\sum_{k_0} W^{n k_0} \sum_{k_1} W^{n 2 k_1} \ldots \sum W_{k_{m-1}}^{n 2^{M-1} k_{M-1}} X_0 (k_{M-1} \ldots k_0)$$

where:

$N = 2^M$.

Each of the sums represents one pass of the M pass algorithm and symmetries in the complex exponentials $W^P$ are used to reduce the number of non-trivia multiplications in the computation. Symmetries used include:

$$W^N = 1; \ W^{N/2} = -1; \ W^{2M+L} = 1 \qquad \text{Eq. 5}$$

Each pass results in the replacement of one temporal bit by a frequency bit with the replacement bits coming in reverse order of the original bits. For an in-place computation this results in the usual butterfly configured signal flow graph shown in FIG. 14.

In pass J, it may be shown that $W^P = 1$ for $k_{M-j-1} = 0$. For $k_{M-j-1}$, $W^P$ is given by:

$$W^P = \pm W^{(n_0 \ldots + 2^{j-1} n_{j-1}) 2^{M-J-1} k_{M-j-1}} \qquad \text{Eq. 6}$$

with $(\pm)$ for $$n_j = \binom{0}{1},$$

respectively. The bits $n_0 \ldots n_{j-1}$ also index the butterfly group number in bit reversed order $(n_0 2^{j-1} \ldots + N_{j-1})$ while the bits $k_{m-j-2} \ldots k_0$ index the individual butterfly in forward order $(k_{M-j-2} 2^{M-j-2} \ldots + 2k_1 + k_0)$. The K and I counters, 202 and 200 (FIG. 11), counters are used for groups and butterflies respectively.

Addressing and Sequencing

Each grouping of adjacent butterflies is called a "wide butterfly"; all the butterflies of any particular wide butterfly will use the same $W^P$ factor.

A new box operation is formed for each pass of the FFT, with the K counter 202 referencing the wide butterfly, and the I counter 200 referencing the butterflies within each wide butterfly. The toggle bit which is the Lth bit from the left of the binary number $(n_0 \ldots n_{L-1}, n_L, K_{M-L-2} \ldots k_0)$ on Pass L is driven separately by the MCO control logic. The following is a synopsis of our FFT notation and addressing for the jth pass of the $2^M$ point FFT.

$$X_J(n_0, \ldots, N_{J-1}, k_{M-J-1}, k_{M-J-2}, \ldots, k_0)$$

$$X_{J+1}(n_0, \ldots, N_{J-1}, n_J, k_{M-J-2}, \ldots, k_0) \qquad \text{Eq. 7}$$

The address of any data element is given by FFT. taking the binary bits of the k counter, the toggle bit, and the I counter, concatenated together in order as shown in line 1 of Eq. 7.

The bits $n_0$ through $n_{J-1}$ are a binary number that indexes the wide butterfly number. The K counter 202 is utilized to supply these bits. The bits $k_{M-J-2}$ through $k_0$ are a binary number indexing the butterfly number within each wide butterfly. The I counter 200 is utilized to supply these bits. The source target pair $(k_{m-J-i}, n_J)$ is determined by the butterfly operation depicted in FIG. 15. The multiplier $W^P$ is utilized, where P is given by:

$$P = (n_0 \ldots + 2^{J-1} n_{J-1}) 2^{M-J-1} k_{m-J-1} \qquad \text{Eq. 8.}$$

An additional multiplier, equal to $-1$, is applied to the 1-1 branch of the butterfly. The binary number $n_0 \ldots k_0$, in total, addresses the data vector both before and after pass J.

The $W^P$ factors are stored in the TBUF 300, with TBUF (j,1) and TBUF (j,2) referencing the real and imaginary parts of $W^j$, respectively.

Performance

The high efficiency of each zone in computing an FFT on the data vector stored there is achieved by interleaving the computations of any given butterfly with those pertaining to preceding and subsequent butterflies of the same pass. Butterfly interleaving in the pipeline processor 16 of each zone is explained below.

Radix-2 Butterfly Interleave:

The FFT to be performed will operate on data stored in the zone buffer 14. The real parts of the data will be stored in the left leaf and the imaginary parts in the right leaf. The vector contains N=2**M complex elements, where M is an integer in the range 0 to 10.

The algorithm used is an in-place decimation in time algorithm that starts with the data in normal order and produces data in bit reversed order. (A final pass is made that shuffles the data into normal order.) A single radix-2 butterfly can be expressed as follows:

$$X = X + W^P Y \quad \text{Eq. 9}$$

$$Y = X - W^P Y \quad \text{Eq. 10}$$

where:
X, Y are elements of the vector in the zone buffer, and
$W^P$ is a complex number of the form $\cos \phi + j \sin \phi$
$\theta = 2\pi P/N$ The complex butterfly arithmetic can be implemented using the following real arithmetic:

$$\begin{aligned} Zr &= W^P r Yr - W^P i Yi \\ Zi &= W^P r Yi + W^P i Yr \end{aligned} = WY \quad \text{Eq. 11}$$

$$Xr = Xr + Zr$$

$$Xi = Xi + Zi$$

$$Yr = Zr - Zr$$

$$Yi = Xi - Zi \quad \text{Eq. 12}$$

A processing schedule for the execution of a butterfly is shown in Table 7. The processing schedule shows multiplier and ALU inputs and outputs, latch contents, and zone accesses during each cycle. For convenience, the power of W is not written in the computation schedule below in Table 7.

TABLE 7

| Cycle | MULT REG L 108 | R 110 | AIN Registers LZ 112 | LM 114 | RM 116 | RZ 118 | MUX L 120 | MUX R 122 | ALU Out | Zbuf Zin | Za | Zm |
|---|---|---|---|---|---|---|---|---|---|---|---|---|
| 1 | | | | | | | | | | | | Yr |
| 2 | Wr | Yr | | | | | | | | | | Yi |
| 3 | Wi | Yi | | | | | | | | | | |
| 4 | | | | | | | | | | | | Yi |
| 5 | Wr | Yi | | | | | | | | | | Yr |
| 6 | Wi | Yr | | | | | | | | | | |
| 7 | | | WrYr | | | | | | | | | |
| 8 | | | | WiYi | | | | | | | | |
| 9 | | | | | | | WrYr | WiYi | | | | |
| 10 | | | WrYi | | | | | | | | | |
| 11 | | | | WiYr | | | | | | | | |
| 12 | | | | | | | WrYi | WiYr | | | | |
| 13 | | | | | | | | | | | | |
| 14 | | | | | | | | | | | | |
| 15 | | | | | | | | | (Zr)* | | | |
| 16 | | | | | | | | | | Yi | Xr | |
| 17 | | | | | Xr | | | | | | Yi | |
| 18 | | | Zr | | | | | | (Zi)** | | | |
| 19 | | | | | | | Zr | Xr | | Yr | Xi | |
| 20 | | | | | | Xi | Zr | Xr | | | | Yr |
| 21 | | | Zi | | | | | | | | | |
| 22 | | | | | | | Zi | Xi | | | | |
| 23 | | | | | | | Zi | Xi | | | | |
| 24 | | | | | | | | | | | | |
| 25 | | | | | | | | | Xr+Zr | | | |
| 26 | | | | | | | | | Xr−Zr | Xr | | |
| 27 | | | | | | | | | | Yr | | |
| 28 | | | | | | | | | Xi+Zi | | | |
| 29 | | | | | | | | | Xi−Zi | Xi | | |
| 30 | | | | | | | | | | Yi | | |

*(Zr) = WrYr−WiYi
**(Zi) = WrYi−WiYi where the headings of Table 7 refer to the notation used in FIG. 9.

Referring now to FIG. 9, a blow-by-blow description of the activities that are diagrammed in Table 7 follows:

1. Yr is accessed and stored in the output register at the Zm zone buffer output port.

2. Yr is read from the Zm output register to the right multiplier input port. Wr is read from TBUF and applied to the left multiplier input port. Yi is accessed and stored in the output register at the Zm zone buffer output port.

3. Yi is read from the Zm output register to the right multiplier input port. Wi is read from TBUF and applied to the left multiplier input port.

4. Yi is accessed and stored in the output register the Zm zone buffer output port.

5. Yi is read from the Zm output register to the right multiplier input port. Wr is read from TBUF and applied to the left multiplier input port. Yr is accessed and stored in the output register at the Zm zone buffer output port.

6. Yr is read from the Zm output register to the right multiplier input port. Wi is read from TBUF and applied to the left multiplier input port.

7. The product WrYr appears at the multiple output and is stored in multiplier output register LM.

8. The product WiYi appears at the multiplier output and is stored in multiplier output register RM.

9. WrYr is read from register LM to the left ALU input. WiYi is read from register RM to the right ALU input.

10. The product WrYi appears at the multiplier output and is stored in multiplier output register LM.

11. The product WiYi appears at the multiplier output and is stored in multiplier output register RM.

12. WrYi is read from register LM to the left ALU input. WiYr is read from register RM to the right ALU input.

13. Internal ALU operations occur.

14. Internal ALU operations occur.

15. The difference WrYr−WiYi appears at the ALU output and is stored in the ALU output register. This difference will be labelled Zr.

16. Zr is stored in the ZBUF at the location formerly by Yi. Xr is accessed and stored into the output register at the Za zone buffer output port.

17. Xr is stored in the RZ register. Zr is accessed from zone buffer location Yi and stored in the output register at the zone buffer Za port.

18. Zr is stored in the LZ register. The sum WrYi appears at the ALU output and is stored in the ALU output register. This sum will be labelled Zi.

19. Zr is read from register LZ and applied to the ALU input. Xr is read from register RZ and applied to the right ALU input. Zi is stored in the ZBUF at the location formerly occupied by Yr. Xi is accessed and stored into the output register at the Za zone buffer output port.

20. Xi is stored in the RZ register. Zr is read from LZ and applied to the left ALU input. Xr is read from register RZ and applied to the right ALU input. Zi is accessed from zone buffer location Yr and stored in the output register at the zone buffer Za port.

21. Zi is stored in the LZ register.

22. Zi is read from register LZ and applied to the left ALU input. Xi is read from register RZ and applied to the right ALU input.

23. Zi is read from register LZ and applied to the ALU input. Xi is read from register RZ and applied to the right ALU input.

24. Internal ALU operations occur.

25. The sum Xr+Zr appears at the ALU output and is stored in the ALU output register.

26. The difference Xr−Zr appears at the ALU output and is stored in the ALU output register. The sum Xr+Zr is stored in the zone buffer at the location formerly occupied by Xr.

27. The difference Xr−Zr is stored in the zone buff at the location formerly occupied by Yr.

28. The sum Xi+Zi appears at the ALU output and is in the ALU output register.

29. The difference Xi−Zi appears at the ALU output and is stored in the ALU output register. The sum Xi+Zi is stored in the zone buffer at the location formerly occupied by Xi.

30. The difference Xi−Zi is stored in the zone buffer at the location occupied by Yi.

31. The butterfly requires 30 cycles to execute. However, no single zone resource is occupied for more than six cycles. By carefully overlapping several butterflies it is possible to finish one butterfly every six cycles. In Table 8 the butterfly schedule of Table 7 is interleaved with the next three butterflies to show how they fit together. Accesses are arranged so that there are no collisions at the ALU inputs and so that whenever Za is producing an imaginary value then Zm is producing a real value, and vice versa. The ALU is producing useful outputs on every cycle, indicating that this butterfly interleave achieves the highest possible utilization of zone resources for the array processor.

In Table 8 a numeral greater than 1 appearing in a column indicates that the processing steps explicitly listed for the first butterfly are being performed for a succeeding butterfly identified by the numeral.

TABLE 8

| Cycle | MULT L | MULT R | LZ | Registers LM | RM | RZ | ALU L | ALU R | Out | Zbuf Zin | Za | Zm |
|---|---|---|---|---|---|---|---|---|---|---|---|---|
| 1 | | | | | | | | | | | | Yr |
| 2 | Wr | Yr | | | | | | | | | | Yi |
| 3 | Wi | Yi | | | | | | | | | | |
| 4 | | | | | | | | | | | | Yi |
| 5 | Wr | Yi | | | | | | | | | | Yr |
| 6 | Wi | Yr | | | | | | | | | | |
| 7 | | | | WrYr | | | | | | | | 2 |
| 8 | 2 | 2 | | | WiYi | | | | | | | 2 |
| 9 | 2 | 2 | | | | | WrYr | WiYi | | | | |
| 10 | | | | WiYi | | | | | | | | 2 |
| 11 | 2 | 2 | | | WiYr | | | | | | | 2 |
| 12 | 2 | 2 | | | | | WrYi | WiYr | | | | |
| 13 | | | | 2 | | | | | | | | 3 |
| 14 | 3 | 3 | | | 2 | | | | | | | 3 |
| 15 | 3 | 3 | | | | | 2 | 2 | (Zr)* | | | |
| 16 | | | | 2 | | | | | | Yi | Xr | 3 |
| 17 | 3 | 3 | | | 2 | Xr | | | | | Yi | 3 |
| 18 | 3 | 3 | | | | | 2 | 2 | (Zi)** | | | |
| 19 | | | | 3 | | | Zr | Xr | | Yr | Xi | 4 |
| 20 | 4 | 4 | | | 3 | Xi | Zr | Xr | | | Yr | 4 |
| 21 | 4 | 4 | Zi | | | | 3 | 3 | 2 | | | |
| 22 | | | | 3 | | | Zi | Xi | | 2 | 2 | 4 |
| 23 | 4 | 4 | | | 3 | 2 | Zi | Xi | | | 2 | 4 |
| 24 | 4 | 4 | 2 | | | | 3 | 3 | 2 | | | |
| 25 | | | | 4 | | | 2 | 2 | Xr+Zr | 2 | 2 | |
| 26 | | | | | 4 | 2 | 2 | 2 | Xr−Zr | Xr | 2 | |
| 27 | | | 2 | | | | 4 | 4 | 3 | Yr | | |
| 28 | | | | 4 | | | 2 | 2 | Xi+Zi | 3 | 3 | |
| 29 | | | | | 4 | 3 | 2 | 2 | Xi−Zi | Xi | 3 | |
| 30 | | | 3 | | | | 4 | 4 | 3 | Yi | | |
| 31 | | | | | | | 3 | 3 | 2 | | 3 | 3 |

TABLE 8-continued

| Cycle | MULT L | MULT R | Registers LZ | Registers LM | Registers RM | Registers RZ | ALU L | ALU R | ALU Out | Zbuf Zin | Zbuf Za | Zbuf Zm |
|---|---|---|---|---|---|---|---|---|---|---|---|---|
| 32 | | | | | | 3 | 3 | 3 | 2 | 2 | 3 | |
| 33 | | | 3 | | | | | | 4 | 2 | | |
| 34 | | | | | | | 3 | 3 | 2 | 4 | 4 | |
| 35 | | | | | | 4 | 3 | 3 | 2 | 2 | 4 | |
| 36 | | | | 4 | | | | | 4 | 2 | | |
| 37 | | | | | | | 4 | 4 | 3 | 4 | 4 | |
| 38 | | | | | | 4 | 4 | 4 | 3 | 3 | 4 | |
| 39 | | | 4 | | | | | | | 3 | | |
| 40 | | | | | | | 4 | 4 | 3 | | | |
| 41 | | | | | | | 4 | 4 | 3 | | | |
| 42 | | | | | | | | | | 3 | | |
| 43 | | | | | | | | | 4 | 3 | | |
| 44 | | | | | | | | | 4 | | | |
| 45 | | | | | | | | | | 4 | | |
| 46 | | | | | | | | | | 4 | | |
| 47 | | | | | | | | | 4 | | | |
| 48 | | | | | | | | | 4 | 4 | | |

*(Zr) = WrYr−WiYi
**(Zi) = WrYi−WiYr

FFTs in 32 Zones:

The array processor can perform up to 32 FFTs simultaneously, one in each zone. At any given instant the same butterfly operation of the same pass is being executed in all zones, but on a data vector which is unique to the particular zone.

The necessary trigonometric quantities are broadcast to the zones over the common path 18, as each quantity will be used at the same time in all zones.

The zone buffers 12 are used in a double buffered fashion to transfer data vectors. At any given time, a first set of 32 transformed data vectors will be outputting at the time that 32 vectors of a second set are in the process of transformation and a third set of 32 vectors are being preloaded into the zone buffers. The following is a computation of the I/O balance for FFTs. The computation is for an MPU clock cycle of 64 ns.

To process 32 vectors, the input time (which is equal to the output time) is given by:

$$T_{IO} = \frac{64 \text{ ns}}{\text{element}} \cdot \frac{N \text{ elements}}{\text{vector}} \cdot 32 \text{ vectors}$$
$$= 2048 N \text{ ns}$$

Eq. 13

The time to compute an FFT (or 32 of them in parallel) is given by:

$$T_c = \frac{N}{2} \frac{\text{butterflies}}{\text{pass}} \cdot \frac{\log_2 N \text{ passes}}{FFT} \cdot \left( \frac{6 \times 64 \text{ ns}}{\text{butterfly}} \right)$$
$$= 192 \, N \log_2 N \text{ ns}$$

Eq. 14

The number of floating point operations to do 32 FFT's is $$N_{FLOP} = \frac{10 \text{ FLOP}}{\text{butterfly}} \cdot \frac{N}{2} \frac{\text{butterflies}}{\text{pass}} \cdot \log_2 N \frac{\text{Passes}}{FFT} \cdot 32$$
$$= 60 \, N \log_2 N$$

Eq. 15

Since the compute time will be limited to be no less than the maximum of $T_c$ and $T_{IO}$, the compute rate is:

$$R = \frac{N_{FLOP}}{\text{Max}\{t_c, T_{IO}\}}$$

Eq. 16

With $T_c$ and $T_{IO}$ measured in ns, R will be measured in GFLOP (1 GFLOPS$=10^9$ floating point operations/sec.). Table 9 below summarizes the resulting rates and times over a range of data vector lengths N.

TABLE 9

| | FFT Computation Rate | | | |
|---|---|---|---|---|
| N | $T_{IO}$ | $T_c$ | $N_{FLOP}$ | R |
| 16 | 32.8 | 12.3 | 10.2 | .3125 |
| 32 | 65.6 | 30.7 | 25.6 | .391 |
| 64 | 131 | 73.7 | 61.4 | .469 |
| 128 | 262 | 172 | 143 | .547 |
| 256 | 524 | 393 | 328 | .625 |
| 512 | 1049 | 885 | 737 | .703 |
| 1024 | 2097 | 1966 | 1638 | .781 |
| 2048 | 4194 | 4325 | 3604 | .833 |

Implementation and Advantages of Inverse and Inverse Root Functions:

Each MLP has first and second hardware lookup tables (LUTS) 100 and 102 (FIG. 9) which are coupled to Za bus 50. The function of the first and second LUTS 100 and 102 is to supply values 1/a and $1/\sqrt{a}$, respectively, to 13 bit accuracy for a number a supplied on the Za bus 50. These initial values are used as input to Newton iterations used to compute 1/a and $1/\sqrt{a}$ to 24 bit accuracy.

Algorithm for 1/a:

The first LUT 100 produces an approximation $R_1$ which is accurate to $E = 2^{-13}$.

$$R_1 = 1/a(1+E)$$

Eq. 17

The zone processor is used to compute a better approximation $R_z$.

$$R_2 = R_1 + R_1 * (1 - R_1 * a)$$

Eq. 18

A careful analysis and totalling of multiplier, ALU and LUT produced errors shows that:

$$R_2 = 1/a(1 - E_L^2 - E_M + E_A)$$

Eq. 19 where $$(LUT \text{ error})^2 = E_L^2 = 2^{-26}$$

$(ALU\ error) = E_A = 2^{-24}$
$(MULT\ error) = E_M = 2^{-36}$

Clearly the ALU error dominates in most cases.

Algorithm for $1/\sqrt{a}$

The second LUT 102 produces an approximation $Y_1$ which is accurate to $E = 2^{-13}$.

$$Y_1 = 1/\sqrt{a}(1+E)$$

The zone processor is used to compute a better approximation $Y_2$.

$$Y_2 = Y_1 + Y_1 * 0.5 * (1 - Y_1^2 * a)$$

A numerical error analysis of $Y_2$ shows that:

$$Y_2 = \frac{1}{\sqrt{a}}\left(1 + E_A - \frac{3}{2}E_L^2 - E_M\right) \quad \text{Eq. 20}$$

with the same order of magnitude on $E_A$, $E_L$ and $E_M$ as before. $E_A = 2^{-24}$ will dominate again in most cases.

There are distinct advantages to a combination LUT-computation approach. In a pure LUT approach a 32 MWord PROM would be needed in the LUT to provide 24 bit accuracy in the 1 divided by square root of a and a 16 MWord prom to 24 bit accuracy in 1/a. In the mixed implementation used here, 8192 word and 4096 word PROMs are used for $1/\sqrt{a}$ and $1/a$, respectively.

In an almost completely iterative approach, on the other hand, starting with a 1 bit approximation (E equal to about $2^{-1}$) 5 times as many computational passes would be required thus t to compute would not be 28 clock cycles but 140.

Use of Indexed Local Storage to Simulate the Effect of a Systolic Data Path

In a systolic data path a sequence of data elements moves successively between one data register and the next with a delay of one clock cycle in between.

Referring now to FIG. 16, assume that the data elements, $a_i$, are numbered 0, 1, 2, ... and the registers 1100 are likewise numbered 0, 1, 2, ..., then if datum $a_0$ is in register 0 at time $\tau$, datum $a_j$ will be in register $R_j$, at time $\tau + j + j'$.

In the present invention, indexed addressing of the zone buffers 12 is used to simulate systolic data flow. Data from the zone buffers may be placed in either of the multiplier registers 108 and 110 or in either the AIN.LZ 112 or AIN.RZ 118 registers in the same sequence as if a systolic data path connect all the equivalent registers in the plurality of processing zones of the RPA. In this usage, part of the zone buffer 12 is dynamically allocated to be the data memory 1211 (see FIG. 17) and part is allocated to be index memory 1220.

In the discussion that follows, the general concept of using indexed addressing of local data to simulate systolic data flow will be fully explained with the understanding that the plurality of data registers 1210 may be any one of the plurality of one type 108, 110, 112, or 118, FIG. 9, of registers in the plurality of MLP's 16 and that the data memories 1211 and index memories 1220 can be dynamically allocatable sections of the plurality of zone buffers 12.

Referring now to FIG. 17, it is seen that the present invention also contains a plurality of data registers 1210. Each of these may be any one of the data registers. Each of these registers is coupled to the output port, O, of its own dual ported local memory 1211 by a local data bus 1212. Each local memory is also coupled to a common or global data input bus 1213 (either the $C_0$ or $C_1$ bus 24a or b, FIG. 9) which from time to time supplies each of the local memories simultaneously with the same input data. Each local memory 1211 is controlled by its own address line 1214.

The effective address which controls each local memory 1211 is communicated to its address port 1215 from an ALU 1216, which is dedicated to that memory alone. Each ALU has two inputs: A first input "a" is from an index register 1217 that is connected only to port a of its own ALU 1216 via a first index bus 1218. A second input to each ALU 1216 is from a common address bus 1219 which is connected to port b of all of the ALU's. The common address may be either AZR, AZL, or AZIN.

Two types of addressing may be supplied to each memory: Indexed and non-indexed. In non-indexed addressing the ALU passes on the global address to the address port 1215 of each local memory 1211. In the indexed addressing case, each ALU 1216 may form the sum or difference of the global address which appears on its port b and the datum in its own index register 1217, which appears on port a. Thus, if the jth index register 1217 contains the integer I(j) and the global address line 1219 supplies the address N; the effective address supplied to the jth local memory over its address line 1214 can be $\pm N \pm I(j)$.

The index register 1217, receives its datum from its own index memory 1220 via a second index bus 1221. The index register is loaded when it receives a "Load Index Register" command at its control port c, over index register control line 1222. The index datum selected for loading from the index memory 1220 is controlled by global address line 1219, which is connected to both the data memory 1211, and to the index memory 1220. New data may be loaded into the index memory by way of its input port I via the global data bus 1213 which connects to both the data memory 1211; and to the index memory 1220.

The selection of ALU function to choose non-indexed addressing or one of several types of indexed addressing is determined by the signal present on indexing control lines 1223.

As will be shown, the present invention can supply data to its plurality of registers in a sequence equivalent to left or right systolic propagation at any multiple or fraction of the clock speed, or alternatively in a global fashion, whereby the same datum appears globally in all of the registers 1210 at the same time.

A first example shows how to supply data globally to the plurality of data registers 1210 from the attached local memories 1211.

| Step 1: | The local memories 1211 supplied with identical data elements $A_0, A_1, \ldots A_N$ which are loaded into the memory locations $0 \ldots N$ by the use of non-indexed addressing. |
|---|---|
| Step 2: | The addresses $N, N-1, \ldots 0$ are used in a non-indexed fashion to place the data elements globally into the data registers 1210 in reverse order. vis: $A_N$ appears globally in all registers $A_{N-1}$ appears globally |
| | $A_0$ appears globally in all registers |

A second example shows how simulate the systolic movement of data to the left between the data registers 1210.

| Step 1: | The data is loaded into the local memories as in the first example. |
|---|---|
| Step 2: | A load index register command on index register control line 1222 and the address 1 on branch 1219a of the global address line cause the data values 0, 1, . . . to be supplied to the index registers 1217, that are numbered 0, 1, . . . 31 respectively, over the second index buses 1218. |
| Step 3: | Index control lines 1223 supply a command to add the data on ports a and b of ALU 1216. Said command continues to be valid over the next cycles. |
| Step 4: | At the same time the aforementioned ALU command is valid, the succession of addresses 0, 1, . . . N are supplied to port b of each of the ALUs 1216. At the time that the address 0 is on port b, plus the ALU delay, the addresses supplied to the data memories via address lines 1214 will be 0, 1, . . . 31 supplied to data memories 1211. Correspondingly, the data $A_0, A_1, \ldots A_{31}$ will be placed in data registers 1 . . . 31 respectively. |

Now in time interval z the address 1 is supplied to port b of the ALU 1216. As a result of this, the addresses 1, 2, . . . 32 are supplied to data memories 0, 1, . . . 31. It follows that data $A_1, A_2, \ldots A_{32}$ are placed in registers 0, 1, . . . 31 respectively.

The data that appears in the registers is exactly as if all the register contents had moved systolically one step to the left.

Now after k line steps:
> k is supplied to port b of each ALU 1216.
> the address k+j is supplied data memory j (1211 in figure)
> datum $A_{k+j}$ is supplied to data register j (1210 in figure)

Therefore, the data in the data registers appears to have been shifted k steps to the left.

The simulated movement of data to the right is accomplished in a fashion similar to the above.

| Step 1: | As above |
|---|---|
| Step 2: | A load index register command on control line 1222 and address 2 on branch 1219a of the global address line cause the data values 31, 30, . . . 0 to be loaded into index registers 1216 which pertain to zones 0, 1, . . . 31 respectively. |
| Step 3: | As above in the previous example |
| Step 4: | As above. Note however that now the data values $A_0 \ldots A_{31}$ appear in registers 31, 30, . . . 0 at time 0. Then at time 2 the data values $a_1, \ldots A_{32}$ appear in registers 31, 30, . . . 0 as if the data had moved one step to the right. |

At time k the datum $A_k$ will be in register 31 and the datum $A_{k+j-32}$ will be in register j, as if the data had moved systolically k steps to the right Correlation and Convolution is an example using indexed addressing.

The correlation "C" of two sequences A(I) and B(I) may be computed as follows $$C(J) = \sum_{I=1}^{N_S} A(I) \cdot B(I + J) \qquad (1) \text{ Eq. 21}$$

where $N_S$ is the length of the A sequence which is the shorter of the two sequences. The displacement of one sequence relative to the other can be accomplished via having both a systolic and a global input to the multiplier 56 or alternatively by combining a global path with indexed local data.

As a first step in a G-IL (Global-Indexed Local) system, the shorter of the two sequences is preloaded into the TBUF 300, and the longer sequence is preloaded identically into all of the zone buffers that will be used.

FIG. 18 illustrates an example in which A(1) I=1,4 has been preloaded into the TBUF 300, and B(I) I=1,6 has been preloaded identically into 11 of the zone buffers 12. Now in the computational sequence, A(I) has been delivered globally to the left hand side of the multipliers at the same time that B(I−4+J) has been retrieved from the zone buffer of zone J (J=0:31) and delivered to the right hand side of the multiplier 60 of the same zone.

The blackened squares represent execution in progress for I=6, while the hatched squares represent data previously used. Thus, in zone 3, A(4) is currently being multiplied by B(3). Looking to equation (1) see that zone 3 will contain C(−1) and in general $$\text{zone } J \rightarrow C(J-4) \qquad (2)$$

The blackened squares (zones 1:6) represent computations that are just being completed. The additional offset of was necessary to insure that all the nontrivial values of C(J) would be obtained, including values for negative J.

Dual Accuracy Zone Arithmetic

The architecture of previous floating point adders has required that the rounding bit of at least one of the addends be preset to zero. This resulted in a possible error of 1 in the least significant bit of the fractional part of the sum.

The floating point adder used in each processing zone of the MZA, on the other hand, allows non-zero rounding bits in both inputs, and produces a sum that is accurate to $\frac{1}{2}$ in the last bit. This improvement is including a second renormalization stage, after rounding, as well as the usual renormalization prior to rounding.

The second renormalization is implemented by adjusting the exponent upward by one if the rounder indicates a carry. This is indicated by box R2 in FIG. 19, which is in the exponent computation path, and data path C, which transmits the carry bit from the rounder. The first renormalization stage is indicated by box R1.

The procedural differences and more accurate result are illustrated by the example shown in FIG. 20, wherein two numbers A, and B, are added. The notations MSB, LSB, RB and SB will be used for most significant bit, least significant bit, rounding bit and "sticky bits," respectively.

It is easily seen that the present invention produces a result of $2^7 \times 0.1$ while the prior art produces $2^7 \times 0.1(1 - 2^{-31})$ which has an error of up to $2^{-1}$ in the last bit.

Thus, the use of a floating point ALU with two renormalization stages in conjunction with a floating point multiplier preceding it, as shown in FIG. 19, allows more accurate computation than existing systems.

The invention has now been described with reference to preferred embodiments. Variations and substitutions to the embodiments, within the scope of the invention, will now be apparent to persons of ordinary skill in the art. Accordingly, it is not intended that the invention be limited except as set forth in the appended claims.

What is claimed is:

1. In an RPA, having N zones, each zone labeled by an index $j=1, \ldots, N$, for performing array operations, with each zone in the array having a common data input port coupled to a common data bus, C0 and C1 buffer input ports coupled to a data-in bus, and a buffer output port coupled to a data-out bus, a jth zone in said array comprising:
   a zone buffer for storing data elements in addressable storage locations, said zone buffer having first and second sides with said first side being a working side having $Z_1$ and $Z_2$ output ports and a Zin input port and with the second side being an I/O side having input port and output port, said working side having a working side address and control signal port and said I/O side having an I/O address and control signal port;
   a controllable multiplier connect circuit (MCC) having a common input port coupled to said common data bus, MCC $Z_1$, and MCC $Z_2$ input ports coupled to said $Z_1$ and $Z_2$ output ports, a left neighbor input port, a right neighbor output port, left and right MCC output ports, and an MCC control signal input port, said MCC for coupling one of said MCC input ports to one of said MCC output ports under control of an MCC control signal;
   a multiplier having left and right multiplier input ports coupled to the left and right MCC output ports of said MCC, a multiplier output port, and a multiplier control signal input port;
   a controllable ALU connect circuit (ACC) having an ALU multiplier input port coupled to the multiplier output port, left and right ACC ALU output ports, an $ACCZ_1$ input port coupled to said $Z_1$ output port, and an ACC control signal input, said ACC for coupling one of said ACC input ports to one of said ACC output ports under control of an ACC control signal; and
   an ALU having left and right ALU input ports coupled to the left and right ACC ALU output ports, an ALU output port coupled to said Zin input port, and an ALU control signal input port.

2. The invention of claim 1 further comprising:
   means for generating a working side address control signal for causing a first data element stored at a first working side addressable storage locations to be directed to said $Z_1$ output port and for causing a second data element directed to said Zin port to be stored at a second working side storage location;
   means for generating an I/O side address control signal for causing a third data element stored at a first I/O side addressable storage location to be directed to said I/O output port and for causing a fourth data element directed to said I/O input port to be stored at a second I/O side storage location;
   means for generating said MCC control signal, multiplier control signal, ACC control signal, and ALU control signal;
   means for adjusting times of arrival of said working side address and control signal, I/O side address and control signal, MCC control signal, multiplier control signal, ACC control signal, and ALU control signal at said jth zone to perform a pipelined point operation involving a data element stored at said first working side storage location with said data element resulting from a point operation stored in said second working storage location; and
   means for supplying said time adjusted control signal to a selected subset of zone to perform a single instruction, multiple data (SIMD) operation.

* * * * *